US012706038B2

(12) United States Patent
Zhang et al.

(10) Patent No.: US 12,706,038 B2

(45) Date of Patent: Aug. 11, 2026

(54) PIXEL DRIVING CIRCUIT, DRIVING METHOD THEREOF AND DISPLAY DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Dingchang Zhang, Beijing (CN); Xuan Feng, Beijing (CN); Minghua Xuan, Beijing (CN); Ming Yang, Beijing (CN); Seungwoo Han, Beijing (CN); Hui Zhang, Beijing (CN); Liwei Liu, Beijing (CN); Zhuo Li, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 274 days.

(21) Appl. No.: 18/716,295

(22) PCT Filed: Aug. 30, 2023

(86) PCT No.: PCT/CN2023/115648

§ 371 (c)(1),
(2) Date: Jun. 4, 2024

(87) PCT Pub. No.: WO2025/043513

PCT Pub. Date: Mar. 6, 2025

(65) Prior Publication Data

US 2026/0171013 A1 Jun. 18, 2026

(51) Int. Cl.

*G09G 3/3233* (2016.01)
*G09G 3/32* (2016.01)

(Continued)

(52) U.S. Cl.

CPC ............ *G09G 3/3233* (2013.01); *G09G 3/32* (2013.01); *G09G 3/3258* (2013.01); *G09G 3/3266* (2013.01); *G09G 3/3291* (2013.01)

(58) Field of Classification Search

CPC .. G09G 3/3208; G09G 3/3233; G09G 3/3258; G09G 2300/0819;

(Continued)

(56) References Cited

U.S. PATENT DOCUMENTS

2015/0029238 A1 1/2015 Kanda et al.
2015/0161944 A1 6/2015 Gai et al.

(Continued)

FOREIGN PATENT DOCUMENTS

CN 103236236 A 8/2013
CN 104485065 A 4/2015

(Continued)

*Primary Examiner* — Nelson M Rosario

(74) *Attorney, Agent, or Firm* — WHDA, LLP

(57) ABSTRACT

Provided is a pixel driving circuit, including: a reset sub-circuit configured to reset a voltage of a first node based on a first scanning signal, and reset a voltage of a second node based on a second scanning signal; a data writing sub-circuit configured to write a data signal into the second node; a driving transistor configured to generate a driving current based on the voltage of the second node; a first emission control sub-circuit configured to transmit a first power supply signal to the driving transistor; a second emission control sub-circuit configured to transmit the driving current to the anode; a storage sub-circuit configured to store the voltage of the second node and adjust the voltage of the first node; an anode reset sub-circuit configured to reset the anode; the first scanning signal line, the third scanning signal line and the fourth scanning signal line are different gate lines.

20 Claims, 9 Drawing Sheets

(51) Int. Cl.
*G09G 3/3258* (2016.01)
*G09G 3/3266* (2016.01)
*G09G 3/3291* (2016.01)

(58) Field of Classification Search
CPC ... G09G 2300/0852; G09G 2300/0861; G09G 2310/0251; G09G 2310/0262; G09G 2310/061; G09G 2320/0214; G09G 2320/0233; G09G 2320/0238; G09G 2320/0247; G09G 2320/043
See application file for complete search history.

(56) References Cited

U.S. PATENT DOCUMENTS

| | | | |
|---|---|---|---|
| 2016/0155379 | A1 | 6/2016 | Na |
| 2016/0189796 | A1 | 6/2016 | Wu et al. |
| 2017/0039942 | A1 | 2/2017 | Han |
| 2017/0270867 | A1 | 9/2017 | Zhu et al. |
| 2017/0294163 | A1 | 10/2017 | Wu et al. |
| 2018/0218681 | A1 | 8/2018 | Cai |
| 2018/0268757 | A1 | 9/2018 | Chen et al. |
| 2020/0105196 | A1 | 4/2020 | Xuan et al. |
| 2020/0265780 | A1 | 8/2020 | Qing |
| 2021/0193022 | A1 | 6/2021 | Xuan et al. |
| 2021/0376026 | A1* | 12/2021 | Mou .................... H10K 59/123 |
| 2023/0410748 | A1 | 12/2023 | Song et al. |
| 2024/0005858 | A1 | 1/2024 | Zhang et al. |
| 2024/0038174 | A1 | 2/2024 | Zhou et al. |
| 2024/0177666 | A1* | 5/2024 | Xiong .................. G09G 3/3233 |
| 2024/0321223 | A1 | 9/2024 | Kim et al. |

FOREIGN PATENT DOCUMENTS

| | | | |
|---|---|---|---|
| CN | 104680982 | A | 6/2015 |
| CN | 104700778 | A | 6/2015 |
| CN | 105789250 | A | 7/2016 |
| CN | 106205480 | A | 12/2016 |
| CN | 106205495 | A | 12/2016 |
| CN | 106531074 | A | 3/2017 |
| CN | 106782286 | A | 5/2017 |
| CN | 107154239 | A | 9/2017 |
| CN | 107424569 | A | 12/2017 |
| CN | 107610651 | A | 1/2018 |
| CN | 108597441 | A | 9/2018 |
| CN | 109584801 | A | 4/2019 |
| CN | 111179854 | A | 5/2020 |
| CN | 111261113 | A | 6/2020 |
| CN | 111696486 | A | 9/2020 |
| CN | 112908267 | A | 6/2021 |
| CN | 113658554 | A | 11/2021 |
| CN | 114822369 | A | 7/2022 |
| CN | 115035858 | A | 9/2022 |
| CN | 115116396 | A | 9/2022 |
| CN | 115410531 | A | 11/2022 |
| CN | 115831070 | A | 3/2023 |
| CN | 116092440 | A | 5/2023 |
| JP | 2007-003706 | A | 1/2007 |
| JP | 2007-011215 | A | 1/2007 |
| JP | 2013-222011 | A | 10/2013 |
| KR | 20190010059 | A | 1/2019 |
| KR | 20220068778 | A | 5/2022 |
| KR | 20220070411 | A | 5/2022 |
| TW | I662535 | B | 6/2019 |

* cited by examiner

PIXEL DRIVING CIRCUIT, DRIVING METHOD THEREOF AND DISPLAY DEVICE

TECHNICAL FIELD

The present application relates to the field of display technology, in particular to a pixel driving circuit, a driving method thereof and a display device.

BACKGROUND

With the continuous development of display industry, the research on display pixel driving circuits has gradually become an important hot spot.

The Light emitting diode (LED) is one of important display devices. However, the Light emitting diode is a current driving device whose light emitting brightness and time are affected by a current magnitude and driving time. In practical application, negative factors, such as coupling capacitance in a pixel driving circuit, electricity leakage of various transistors, threshold voltage (Vth) deviation of a transistor in a display panel due to an uneven preparation process of the transistors, threshold voltage drift caused by long-term unidirectional voltage bias of the Light emitting diode, and IR Drop caused by wire resistance in a circuit, all affect the stability of the pixel driving circuit, thus causing uneven light emitting brightness of the Light emitting diodes and reducing a display effect of a display product.

SUMMARY

The following technical solutions are used in embodiments of the present disclosure.

In a first aspect, an embodiment of the present disclosure provides a pixel driving circuit, the pixel driving circuit in an $n^{th}$ row includes:

- a reset sub-circuit electrically connected with a first reset signal line, a first scanning signal line, a first node, a second reset signal line, a second scanning signal line and a second node, the reset sub-circuit is configured to reset a voltage of the first node under the control of a first scanning signal, and further configured to reset a voltage of the second node under the control of a second scanning signal;
- a data writing sub-circuit electrically connected with a data line, a third scanning signal line and the second node, the data writing sub-circuit is configured to write a data signal transmitted by the data line into the second node;
- a driving transistor, a gate of the driving transistor is electrically connected with the second node, a first electrode of the driving transistor is electrically connected with a third node, a second electrode of the driving transistor is electrically connected with the first node, and the driving transistor is configured to generate a driving current under the control of the voltage of the second node;
- a first emission control sub-circuit electrically connected with a first emission control signal line, a first power supply line and the third node, the first emission control sub-circuit is configured to transmit a first power supply signal to the driving transistor under the control of a first emission control signal;
- a second emission control sub-circuit electrically connected with a second emission control signal line, the first node and an anode of a light emitting device respectively, the second emission control sub-circuit is configured to transmit the driving current to the anode under the control of a second emission control signal;
- a storage sub-circuit electrically connected with the first node, the second node and the first power supply line, the storage sub-circuit is configured to store the voltage of the second node and adjust the voltage of the first node; and
- an anode reset sub-circuit electrically connected with the anode, a fourth scanning signal line and a second power supply line, the anode reset sub-circuit is configured to reset the anode under the control of a fourth scanning signal;
- n is a positive integer, and the first scanning signal line, the third scanning signal line and the fourth scanning signal line are gate lines in different rows.

In at least one embodiment of the present disclosure, pulse widths of scanning signals loaded on the first scanning signal, the third scanning signal and the fourth scanning signal are the same.

In at least one embodiment of the present disclosure, the first scanning signal line is an $(n-4)^{th}$ gate line, the third scanning signal line is an $n^{th}$ gate line, and the fourth scanning signal line is an $(n+2)^{th}$ gate line;

- the $n^{th}$ gate line is electrically connected with the $n^{th}$ row of pixel driving circuits, an $n^{th}$ second scanning signal line is electrically connected with the $n^{th}$ row of pixel driving circuits, and n is greater than 4.

In at least one embodiment of the present disclosure, an $m^{th}$ row of pixel driving circuits are dummy pixel driving circuits, m is a positive integer, and m is greater than or equal to 1 and less than or equal to 4, and is equal to n+1 or n+2;

- the $m^{th}$ row of pixel driving circuits are electrically connected with a shifting register in an $m^{th}$ row.

In at least one embodiment of the present disclosure, the first reset signal line includes a reference signal line, the second reset signal line includes an initialization signal line, and an absolute value of a difference between a voltage of a reference signal transmitted by the reference signal line and a voltage of an initialization signal transmitted by the initialization signal line is greater than a threshold voltage of the driving transistor.

In at least one embodiment of the present disclosure, the first reset signal line includes the first power supply line, and the second reset signal line includes the second power supply line.

In at least one embodiment of the present disclosure, the data writing sub-circuit includes a first transistor, a gate of the first transistor is electrically connected with the third scanning signal line, a first electrode of the first transistor is electrically connected with the data line, and a second electrode of the first transistor is electrically connected with the gate of the driving transistor through the second node.

In at least one embodiment of the present disclosure, a switching transistor is further arranged in series between the data line and the first transistor, and the switching transistor is configured to write the data signal into the data line before the first transistor is turned on.

In at least one embodiment of the present disclosure, the data writing sub-circuit includes a first transistor and a seventh transistor, a gate of the first transistor is electrically connected with the third scanning signal line, a first electrode of the first transistor is electrically connected with the data line, and a second electrode of the first transistor is electrically connected with a first electrode of the seventh transistor; and a gate of the seventh transistor is electrically connected with the second scanning signal line, and a second electrode of the seventh transistor is electrically connected with the gate of the driving transistor through the second node.

In at least one embodiment of the present disclosure, the reset sub-circuit includes a second transistor and a fourth transistor; and a gate of the second transistor is electrically connected with the second scanning signal line, a first electrode of the second transistor is electrically connected with the first reset signal line, and a second electrode of the second transistor is electrically connected with the gate of the driving transistor through the second node; and a gate of the fourth transistor is electrically connected with the first scanning signal line, a first electrode of the fourth transistor is electrically connected with the second reset signal line, and a second electrode of the fourth transistor is electrically connected with the first node.

In at least one embodiment of the present disclosure, the first emission control sub-circuit includes a third transistor;

a gate of the third transistor is electrically connected with the first emission control signal line, a first electrode of the third transistor is electrically connected with the first power supply line, and a second electrode of the third transistor is electrically connected with the third node.

In at least one embodiment of the present disclosure, the second emission control sub-circuit includes a fifth transistor;

a gate of the fifth transistor is electrically connected with the second emission control signal line, a first electrode of the fifth transistor is electrically connected with the first node, and a second electrode of the fifth transistor is electrically connected with the anode.

In at least one embodiment of the present disclosure, the storage sub-circuit includes a first capacitor and a second capacitor;

a first electrode of the first capacitor is electrically connected with the second node, and a second electrode of the first capacitor is electrically connected with the first node; and a first electrode of the second capacitor is electrically connected with the first power supply line, and a second electrode of the second capacitor is electrically connected with the second electrode of the first capacitor through the first node.

In at least one embodiment of the present disclosure, the anode reset sub-circuit includes a sixth transistor;

a gate of the sixth transistor is electrically connected with the fourth scanning signal line, a first electrode of the sixth transistor is electrically connected with the anode, and a second electrode of the sixth transistor is electrically connected with the second power supply line and a cathode of the light emitting device respectively.

In at least one embodiment of the present disclosure, when the data writing sub-circuit includes the first transistor, the first transistor, the second transistor, the third transistor, the fourth transistor, the fifth transistor, the sixth transistor and the driving transistor are all N-type transistors; and when the data writing sub-circuit includes the first transistor and the seventh transistor, the first transistor, the second transistor, the third transistor, the fourth transistor, the fifth transistor, the sixth transistor and the driving transistor are all N-type transistors, and the seventh transistor is a P-type transistor.

In at least one embodiment of the present disclosure, when the driving transistor is a N-type transistor, the voltage of the reference signal is greater than the voltage of the initialization signal.

In at least one embodiment of the present disclosure, the absolute value of the difference between the voltage of the reference signal and the voltage of the initialization signal ranges from 2 V to 4 V.

In at least one embodiment of the present disclosure, a rising edge of a pulse signal transmitted by the second scanning signal coincides with a rising edge of a pulse signal transmitted by the first scanning signal, and a falling edge of the pulse signal transmitted by the second scanning signal coincides with a rising edge of a pulse signal transmitted by the third scanning signal, or the falling edge of the pulse signal transmitted by the second scanning signal is located behind the rising edge of the pulse signal transmitted by the third scanning signal.

In at least one embodiment of the present disclosure, a scanning time of the third scanning signal is greater than a scanning time of the second scanning signal.

In at least one embodiment of the present disclosure, an overlapping time of the first emission control signal and the second scanning signal is greater than the overlapping time of the third scanning signal and the second scanning signal.

In at least one embodiment of the present disclosure, the first emission control signal includes a first pulse signal and a second pulse signal, the second emission control signal includes a third pulse signal, and the second pulse signal coincides with the third pulse signal.

In at least one embodiment of the present disclosure, a capacitance value of the second capacitor is less than a capacitance value of the first capacitor.

In at least one embodiment of the present disclosure, the first transistor, the second transistor, the fourth transistor and the fifth transistor are all double-gate transistors; and two gates of the same transistor are electrically connected together; or the first transistor, the second transistor, the fourth transistor and the fifth transistor are all metal oxide transistors.

In at least one embodiment of the present disclosure, the driving transistor is a double-gate transistor, one gate of the driving transistor is electrically connected with the second node, the other gate of the driving transistor is electrically connected with a signal input end with a constant voltage, and the constant voltage is less than a threshold voltage of the driving transistor.

In at least one embodiment of the present disclosure, the light emitting device includes an organic Light emitting diode, a micro Light emitting diode or a mini Light emitting diode.

In a second aspect, an embodiment of the present disclosure provides a display device, including the pixel driving circuit described in the first aspect.

In a third aspect, an embodiment of the present disclosure provides a driving method, applied to the pixel driving circuit described in the first aspect, the method includes:

in a first stage, inputting a first emission control signal at low level to the first emission control signal line, inputting a second emission control signal at low level to the second emission control signal line, inputting a first scanning signal at high level to the first scanning signal line, inputting a second scanning signal at high level to the second scanning signal line, inputting a third scanning signal at low level to the third scanning signal line, and inputting a fourth scanning signal at low level to the fourth scanning signal line;

in a second stage, inputting a first emission control signal at high level to the first emission control signal line, inputting the second emission control signal at low level to the second emission control signal line, inputting a first scanning signal at low level to the first scanning signal line, inputting a second scanning signal at high level to the second scanning signal line, inputting the third scanning signal at low level to the third scanning signal line, and inputting the fourth scanning signal at low level to the fourth scanning signal line;

in a third stage, inputting the first emission control signal at low level to the first emission control signal line, inputting the second emission control signal at low level to the second emission control signal line, inputting the first scanning signal at low level to the first scanning signal line, inputting a second scanning signal at low level to the second scanning signal line, inputting a third scanning signal at high level to the third scanning signal line, and inputting the fourth scanning signal at low level to the fourth scanning signal line;

in a fourth stage, inputting a first emission control signal at low level to the first emission control signal line, inputting the second emission control signal at low level to the second emission control signal line, inputting a first scanning signal at low level to the first scanning signal line, inputting a second scanning signal at low level to the second scanning signal line, inputting the third scanning signal at low level to the third scanning signal line, and inputting a fourth scanning signal at high level to the fourth scanning signal line; and in a fifth stage, inputting the first emission control signal at high level to the first emission control signal line, inputting a second emission control signal at high level to the second emission control signal line, inputting a first scanning signal at low level to the first scanning signal line, inputting the second scanning signal at low level to the second scanning signal line, inputting the third scanning signal at low level to the third scanning signal line, and inputting the fourth scanning signal at low level to the fourth scanning signal line.

The above explanation is merely an overview of the technical solutions of the present disclosure. In order to know about the technical means of the present disclosure more clearly so that the solutions may be implemented according to the contents of the specification, and in order to make the above and other objects, features and advantages of the present disclosure more apparent and understandable, specific implementations of the present disclosure are set forth below.

BRIEF DESCRIPTION OF THE DRAWINGS

In order to illustrate technical solutions of the embodiments of the present disclosure or the related art more clearly, the accompanying drawings used in the illustration of the embodiments or the related art will be briefly introduced. Apparently, the accompanying drawings in the following explanation illustrate merely some embodiments of the present disclosure, and those skilled in the art may obtain other accompanying drawings based on these accompanying drawings without paying any creative effort.

DETAILED DESCRIPTION

Figure 1:
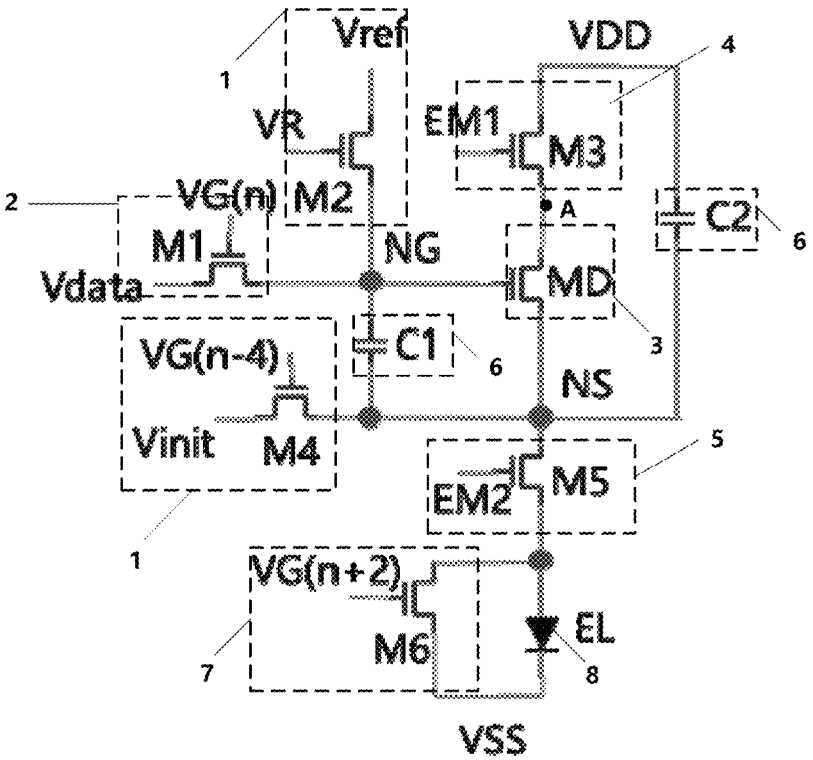
FIG. 1 and FIG. 2 are schematic structural diagrams of two pixel driving circuits provided by embodiments of the present disclosure.

A clear and thorough illustrating for technical solutions in the embodiments of the present disclosure will be given below in conjunction with the accompanying drawings in the embodiments of the present disclosure. Apparently, the described embodiments are merely a part of embodiments of the present disclosure, not all the embodiments. All other embodiments obtained, based on the embodiments in the present disclosure, by those skilled in the art without paying creative effort fall within the protection scope of the present disclosure.

In the embodiments of the present disclosure, wordings such as "first", "second", "third" and "fourth" are used to distinguish the same or similar items with basically the same function and effect, and are only used for clearly describing the technical solutions of the embodiments of the present disclosure, and cannot be understood as indicating or implying relative importance or implicitly indicating the number of indicated technical features.

In embodiments of the present disclosure, the orientation or positional relationship indicated by the term "above", "below" is based on the orientation or positional relationship shown in the drawings, and is only for the convenience of describing the present disclosure and simplifying the description, rather than indicating or implying that the device or element referred to must have a specific orientation, be constructed and operated in a specific orientation, and therefore cannot be construed as a limitation on the present disclosure.

In the explanation of the specification, the terms "an embodiment", "some embodiments", "an exemplary embodiment", "an example", "specific examples" or "some examples" are intended to indicate that specific features, structures, materials or characteristics related to the embodiment or example are included in at least one embodiment or example of the present disclosure. Schematic representations of the above terms do not necessarily refer to the same embodiment or example. Furthermore, the particular features, structures, materials or characteristics described may be included in any suitable manner in any one or more embodiments or examples.

In the embodiments of the present disclosure, "multiple" means two or more, and "at least one" means one or more, unless otherwise explicitly and specifically limited.

Features such as "parallel", "perpendicular" and "identical" used in the embodiments of the present disclosure include features in a strict meaning of "parallel", "perpendicular", "identical", as well as conditions with a certain tolerance, such as "approximately parallel", "approximately perpendicular", "substantially the same", considering the tolerance in the measurement and associated with the measurement of the particular quantity (e.g., limitations of a measurement system), meaning that it is within a deviation range of a particular value acceptable for those skilled in the art. For example, "approximately" may mean being within one or more standard deviations, or within 10% or 5% of a stated value.

Unless it is otherwise defined in the context, the term "comprising/including" throughout the specification and claims is interpreted in an open and inclusive sense, that is, "including, but not limited to".

The "same layer" in embodiments of the present disclosure refers to the relationship between multiple film layers formed by the same material after the same step (such as one-step patterning process). The "same layer" herein does not always mean that the multiple film layers have the same thickness or the multiple film layers have the same height in a sectional view. The polygon in the specification is not in the strict sense, and may be an approximate triangle, parallelogram, trapezoid, pentagon or hexagon, and there may be some small deformation caused by tolerance.

In the embodiments of the present disclosure, since a source and a drain of a transistor are symmetrical, the source and the drain are interchangable. In the embodiments of the present disclosure, one of the source and the drain of the transistor is called as a first electrode, and the other of the source and the drain is called as a second electrode.

In the embodiments of the present disclosure, the term "electrical connection" may refer to a direct electrical connection between two components or an electrical connection between two components through one or more other components.

According to the present disclosure, an improvement is made on the basis of a traditional 5T1C (5 transistors and 1 capacitor) source-following internally-compensating pixel driving circuit. In the source-following compensating pixel circuit, a threshold voltage (Vth) of a driving transistor is written into a source of the driving transistor through compensation, so that the stability of a source potential of the driving transistor is very important. Although the traditional 5T1C pixel driving circuit can realize the compensation of the threshold voltage (Vth) of the driving transistor, there are still the following problems: 1. in a driving process, the source of the driving transistor is always directly connected with an anode of a Light emitting diode, and thus will be affected by an unstable anode potential caused by uneven diode manufacturing and threshold voltage drift caused by long-term unidirectional voltage bias of the diode; 2. the Light emitting diode itself has a capacitance, and the capacitance is equivalent to a parasitic capacitance of the transistor, which is easy to form a capacitive coupling line, so that some scanning signals in the pixel circuit, when the potentials are changed, interfere with potentials of key nodes (such as a gate and a source of the driving transistor) in the circuit; 3. after the compensation stage, the transistor and the Light emitting diode in the circuit may inevitably leak electricity, which will have a negative impact on a compensation effect of the threshold voltage of the driving transistor; and 4. a brightness change of the Light emitting diode is greatly influenced by a change of an operating current, that is, a smaller change of the operating current will cause a larger change of the display brightness. When the pixel driving circuit in the related art is used in a display device of a Micro LED (Micro light Emitting Diode) or a Mini LED (Mini light Emitting Diode), the fineness of the change of the operating current of the Light emitting diode cannot be adjusted, so that the adjustment accuracy of a gray scale of display is low.

In view of the above, an embodiment of the present disclosure provides a pixel driving circuit, a driving method thereof and a display device. The pixel driving circuit is capable of improving the above problem by setting the transistor, the capacitor and a timing sequence signal. In addition, the pixel driving circuit is capable of utilizing gate driving signals provided by various rows of gate lines, so that a number of external signal lines required is small, and types and a number of shifting registers externally connected with the pixel driving circuit are significantly reduced, thus being beneficial for preparing a display device with a narrow bezel.

The pixel driving circuit, the driving method thereof and the display device provided by the embodiment of the present disclosure are introduced and described hereinafter with reference to the drawings.

The display device includes a display region and a peripheral region located around the display region. The display region includes a plurality of sub-pixels, and each sub-pixel is provided with a light emitting device and a pixel driving circuit for providing a driving signal for the light emitting device.

Figure 2:
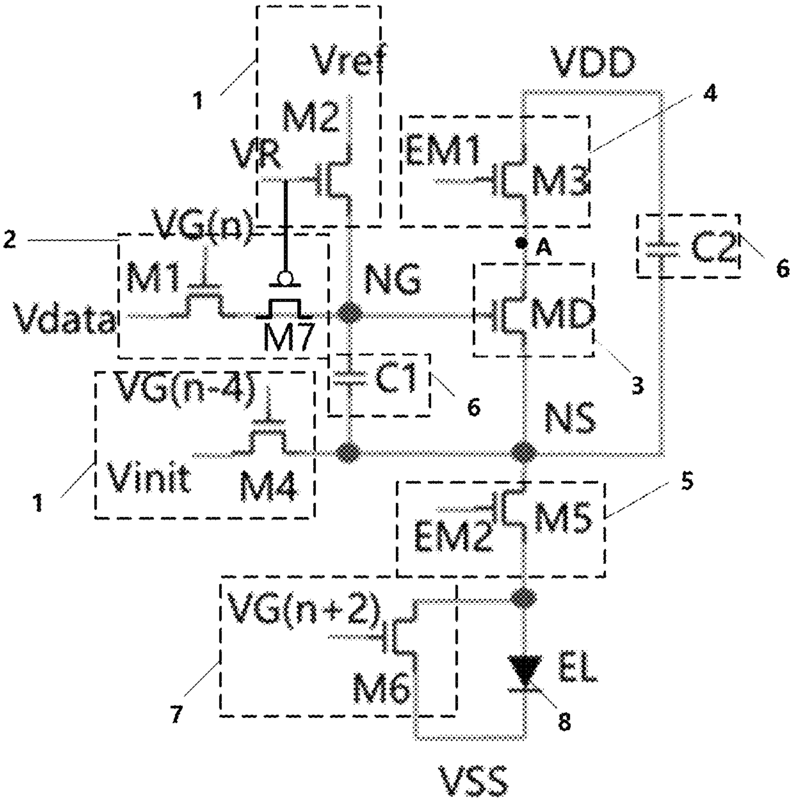

An embodiment of the present disclosure provides a pixel driving circuit, as shown in FIG. 1 or FIG. 2, a pixel driving circuit in an $n^{th}$ row includes a reset sub-circuit 1, a data writing sub-circuit 2, a driving transistor MD, a first emission control sub-circuit 4, a second emission control sub-circuit 5, a storage sub-circuit 6 and a reset sub-circuit 7.

The reset sub-circuit 1 is electrically connected with a first reset signal line (for example, a Ref line), a first scanning signal line (for example, an $n-4^{th}$ gate line), a first node NS, a second reset signal line (for example, a Vinit line), a second scanning signal line (for example, a VR line) and a second node NG. The reset sub-circuit 1 is configured to reset a voltage of the first node NS under the control of a first scanning signal VG(n−4), and further configured to reset a voltage of the second node NG under the control of a second scanning signal VR.

The data writing sub-circuit 2 is electrically connected with a data line (Date line), a third scanning signal line (for example, an $n^{th}$ gate line) and the second node NG, and configured to write a data signal VData transmitted through the data line (Date line) into the second node NG.

The gate of the driving transistor MD is electrically connected with the second node NG, a first electrode of the driving transistor MD is electrically connected with a third node A, a second electrode of the driving transistor MD is electrically connected with the first node NS. The driving transistor MD is configured to generate a driving current under the control of the voltage of the second node NG;

The first emission control sub-circuit 4 is electrically connected with a first emission control signal line (EM1 line), a first power supply line (VDD line) and the third node A, and configured to transmit a first power supply signal VDD to the driving transistor MD under the control of a first emission control signal EM1. The second emission control sub-circuit 5 is electrically connected with a second emission control signal line (EM2 line), the first node NS and an anode of a light emitting device 8 respectively, and configured to transmit the driving current to the anode of the light emitting device 8 under the control of a second emission control signal EM2.

The storage sub-circuit 6 is electrically connected with the first node NS, the second node NG and the first power supply line (VDD line), and configured to store the voltage of the second node NG and adjust the voltage of the first node NS.

The reset sub-circuit 7 is electrically connected with the anode of the light emitting device 8, a fourth scanning signal line (for example, an n+2$^{nd}$ gate line) and a second power supply line (VSS line), and configured to reset the anode of the light emitting device 8 under the control of a fourth scanning signal VG(n+2).

Among them, n is a positive integer, and the first scanning signal line, the third scanning signal line and the fourth scanning signal line are gate lines for different rows.

Specific circuit structures included in the reset sub-circuit 1, the data writing sub-circuit 2, the first emission control sub-circuit 4, the second emission control sub-circuit 5, the storage sub-circuit 6 and the reset sub-circuit 7 are not limited herein, as long as corresponding functions are all within a protection range of the pixel driving circuit provided by the embodiment of the present disclosure.

The first node NS, the second node NG and the third node A above are not actual circuit structures, but are just concepts defined for the convenience of describing the circuit structures, which is hereby explained.

It should be noted that the "n$^{th}$ gate line" above refers to a gate line corresponding to an n$^{th}$ row of sub-pixels, that is, a gate line for the n$^{th}$ row, and one gate line is connected with one row of sub-pixels. Other similar descriptions have similar meanings herein, which will not be described in detail hereinafter.

In an exemplary embodiment, the light emitting device 8 may be a Light emitting diode (LED), an organic Light emitting diode (OLED), a micro Light emitting diode (Micro LED) or a mini Light emitting diode (Mini LED).

When the light emitting device 8 is the organic Light emitting diode (OLED), the display device may be a silicon-based display device or a glass-based display device. The silicon-based display device means that the driving circuit of the display device is disposed on a silicon-based substrate, and the driving circuit is prepared through an MOS process; and the glass-based display device means that the driving circuit of the display device is disposed on a glass-based substrate, and the driving circuit is prepared through a TFT process.

In an exemplary embodiment, the reset sub-circuit 1 may be used for resetting voltages of key nodes (for example, the first node NS electrically connected with the driving transistor MD and the second node NG electrically connected with the gate of the driving transistor MD) in the pixel driving circuit before refreshing various pixel driving circuits (rewriting new signals) in one row of sub-pixels, so as to eliminate a residual signal in a previous frame, thus avoiding a ghost shadow in the next frame. When the pixel driving circuit is applied in a display device, a display effect of the display device can be improved.

In some embodiments, as shown in FIG. 1, the data writing sub-circuit 2 is electrically connected with the data line (Data line), the third scanning signal line (for example, the n$^{th}$ gate line) and the second node NG respectively.

In other embodiments, as shown in FIG. 2, the data writing sub-circuit 2 is electrically connected with the data line (Data line), the third scanning signal line (for example, the n$^{th}$ gate line) and the second node NG respectively, and the data writing sub-circuit 2 is also electrically connected with the second scanning signal line (for example, the VR line).

The type of the driving transistor MD is not limited herein, and transistors may be divided into N-type transistors and P-type transistors.

Illustratively, the driving transistor MD may be a N-type transistor or a P-type transistor.

In addition, the reset sub-circuit 1, the data writing sub-circuit 2, the first emission control sub-circuit 4, the second emission control sub-circuit 5 and the reset sub-circuit 7 each include at least one transistor.

Types of transistors in the reset sub-circuit 1, the data writing sub-circuit 2, the first emission control sub-circuit 4, the second emission control sub-circuit 5 and the reset sub-circuit 7 are not limited herein.

In the present disclosure, various transistors may be independently selected from the N-type transistor or the P-type transistor respectively. For the N-type transistor, an enabled level state is a high level state, and a disabled level state is a low level state; and for the P-type transistor, an enabled level state is a low level state, and a disabled level state is a high level state. The enabled level state refers to a level state enabling the first electrode and the second electrode of the transistor to be turned on, and the disabled level state refers to a level state enabling the first electrode and the second electrode of the transistor to be turned off.

In some examples, the driving transistor MD may include a gate that is electrically connected with the second node NG.

In some other examples, the driving transistor MD may include two gates, and the two gates are connected together and then electrically connected with the second node NG.

In yet some other examples, the driving transistor MD may include two gates, and the two gates are connected with different nodes and have different potentials. For example, one gate of the driving transistor MD is electrically connected with the second node NG, and used for controlling the driving transistor MD to be turned on or turned off; and the other gate of the driving transistor is electrically connected with a signal input terminal with a constant voltage, and used for stabilizing a threshold voltage of the driving transistor MD to improve the driving stability of the driving transistor MD. A voltage provided by the signal input terminal with the constant voltage cannot interfere with the on and off states of the driving transistor MD. Thus, an absolute value of the constant voltage is set to be less than an absolute value of the threshold voltage of the driving transistor MD.

In an exemplary embodiment, the first power supply line (VDD line) is a positive power supply signal line, the second power supply line (VSS line) is a negative power supply signal line. The first power supply line (VDD line) and the second power supply line (VSS line) may both continuously provide a signal with a constant voltage, and a voltage of the first power supply signal VDD provided by the first power supply line (VDD line) is greater than a voltage of the second power supply signal VSS provided by the second power supply line (VSS line).

In some embodiments, the second power supply signal line (VSS line) may be electrically connected with a ground line GND.

In an exemplary embodiment, as shown in FIG. 1 or FIG. 2, the first emission control sub-circuit 4 is used for electrically connecting the first power supply line (VDD line) with the first electrode of the driving transistor MD, the second emission control sub-circuit 5 is used for electrically connecting the second electrode of the driving transistor MD with the anode of the light emitting device 8, and the cathode of the light emitting device 8 is electrically connected with the second power supply line (VSS line). When the first emission control sub-circuit 4, the driving transistor MD and the second emission control sub-circuit 5 are turned on at the same time, a path between the positive power supply signal line, the driving transistor MD, the light emitting device 8 and the negative power supply signal line is a conductive path, so that the light emitting device 8 can emit light.

In an exemplary embodiment, the first emission control signal EM1 transmitted through the first emission control signal line (EM1 line) may be provided by an EM GOA (also called as EOA), or the first emission control signal EM1 transmitted through the first emission control signal line (EM1 line) may be provided by a driver chip.

In an exemplary embodiment, the second emission control signal EM2 transmitted through the second emission control signal line (EM2 line) may be provided by an EOA (also called as EM GOA), or the second emission control signal EM2 transmitted through the second emission control signal line (EM2 line) may be provided by a driver chip. The EOA refers to an emission control shifting register on array, and is used for providing emission control signals to pixel driving circuits of sub-pixels in the display region AA, so as to control the sub-pixels in the display region AA to emit light.

Figure 16:
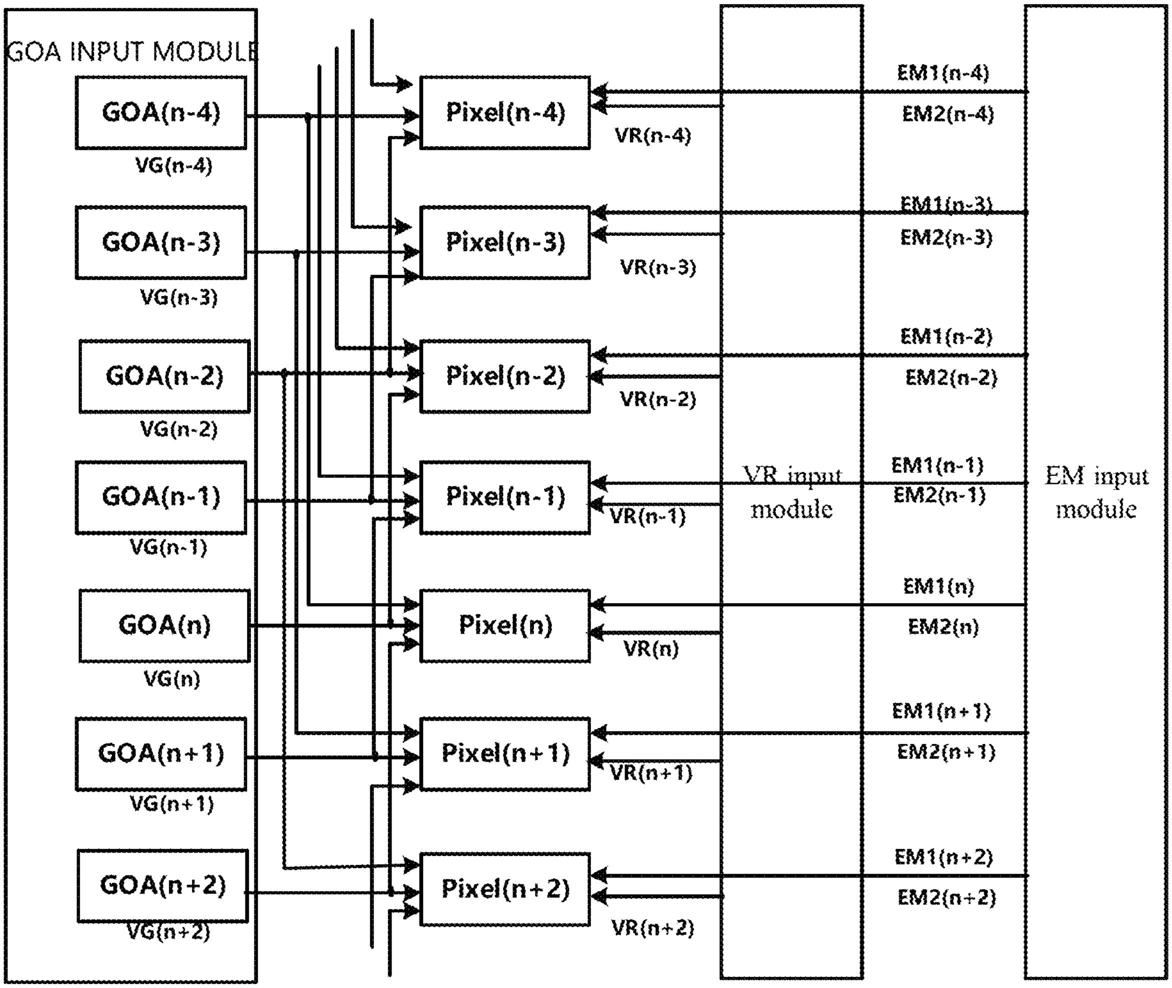
FIG. 16 is a schematic diagram illustrating electrical connection of different rows of pixel driving circuits.

As shown in FIG. 16, each row of sub-pixels corresponds to one first emission control signal line (EM1 line), and each row of sub-pixels corresponds to one second emission control signal line (EM2 line), that is, the same row of sub-pixels is electrically connected with the same first emission control signal line (EM1 line), and the same row of sub-pixels is electrically connected with the same second emission control signal line (EM2 line).

In an exemplary embodiment, as shown in FIG. 16, the first scanning signal line, the third scanning signal line and the fourth scanning signal line are gate lines for different rows. In other words, the $n^{th}$ row of pixel driving circuits are not only electrically connected with the gate line for the $n^{th}$ row (the $n^{th}$ gate line), but also electrically connected with other gate lines except the $n^{th}$ gate line, so that gate lines for different rows provide scanning signals with different time sequences for the pixel driving circuits. In this way, it is avoided arranging other kinds of signal lines outside the display region (where the pixel driving circuit is arranged) to provide driving signals to the pixel driving circuits, thereby making a number of external signal lines required small, significantly reducing types and a number of shifting registers externally connected with the pixel driving circuit, and being beneficial for preparing a display device with a narrow bezel.

Figure 3:
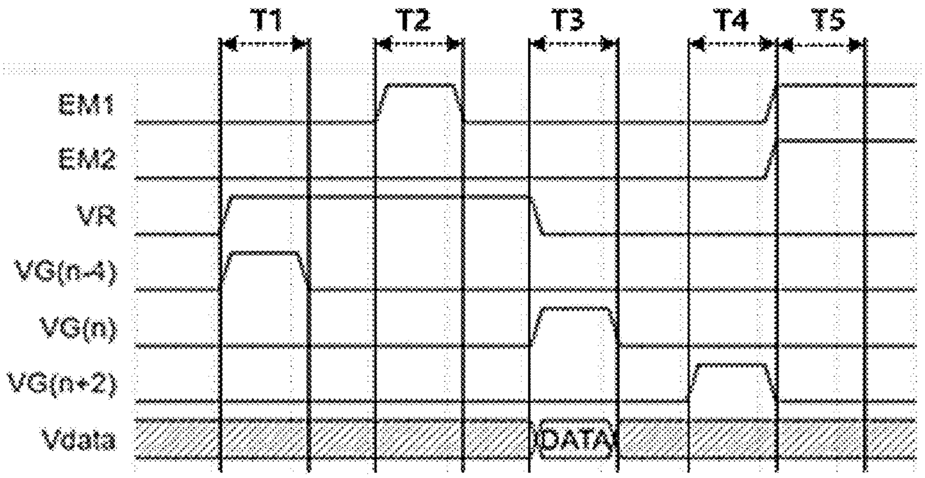
FIG. 3 is a timing sequence chart provided by an embodiment of the present disclosure.

In at least one embodiment of the present disclosure, as shown in FIG. 3, pulse widths of scanning signals loaded on the first scanning signal VG(n−4), the third scanning signal VG(n) and the fourth scanning signal VG(n+2) are the same.

Figure 4:
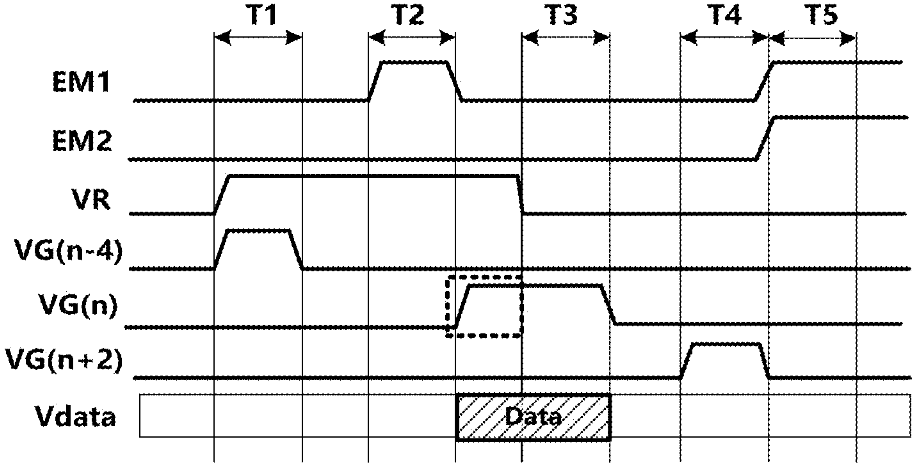
FIG. 4 is another timing sequence chart provided by an embodiment of the present disclosure.

It should be noted that the pulse widths of the first scanning signal VG(n−4), the third scanning signal VG(n) and the fourth scanning signal VG(n+2) drawn in FIG. 4 are only exemplary. In practical application, the pulse widths of the scanning signals loaded on the first scanning signal VG(n−4), the third scanning signal VG(n) and the fourth scanning signal VG(n+2) shown in FIG. 4 are the same.

The first scanning signal VG(n−4), the third scanning signal VG(n) and the fourth scanning signal VG(n+2) are all generated by a shifting register (GOA).

In at least one embodiment of the present disclosure, as shown in FIG. 16, the first scanning signal line is an $(n-4)^{th}$ gate line, and the $(n-4)^{th}$ gate line is electrically connected with an $(n-4)^{th}$ stage of shifting register GOA (n−4) for transmitting the VG(n−4) signal; the third scanning signal line is an $n^{th}$ gate line, and the $n^{th}$ gate line is electrically connected with an $n^{th}$ stage of shifting register GOA (n) for transmitting the VG(n) signal; and the fourth scanning signal line is an $(n+2)^{th}$ gate line, and the $(n+2)^{th}$ gate line is electrically connected with an $(n+2)^{th}$ stage of shifting register GOA (n+2) for transmitting the VG(n+2) signal.

The $n^{th}$ gate line is electrically connected with the $n^{th}$ row of pixel driving circuits (in FIG. 16, Pixel(n) is used to represent the $n^{th}$ row of sub-pixels), the second scanning signal line (VR line) in the $n^{th}$ row is electrically connected with the $n^{th}$ row of pixel driving circuits, and n is greater than 4.

In at least one embodiment of the present disclosure, an $m^{th}$ row of pixel driving circuits are dummy pixel driving circuits (pixel driving circuits arranged in a Dummy pixel row), m is a positive integer, and m is greater than or equal to 1 and less than or equal to 4, and is equal to n+1 or n+2. The $m^{th}$ row of pixel driving circuits are electrically connected with an $m^{th}$ shifting register.

It should be noted that the Dummy pixel row (dummy pixel row) may transmit a scanning signal, without actually displaying light.

In the embodiment of the present disclosure, for the $n^{th}$ row of pixel driving circuits, when n=5, the first scanning signal line is the $1^{st}$ gate line, the third scanning signal line is the $5^{th}$ gate line, and the fourth scanning signal line is the $7^{th}$ gate line. In order to normally drive the $5^{th}$ row of pixel driving circuits, it is necessary to arrange four rows of dummy pixel driving circuits and four rows of shifting registers in front of the $5^{th}$ row of pixel driving circuits, so as to normally provide scanning signals to pixel driving circuits behind the $5^{th}$ row of pixel driving circuits. In addition, for the last row (that is, the $n^{th}$ row) of pixel driving circuits actually used for display, since the fourth scanning signal provided by the $(n+2)^{th}$ gate line is needed, at least two rows of dummy pixel driving circuits and at least two rows of shifting registers need to be provided after the $n^{th}$ row of pixel driving circuits, so as to provide scanning signals to pixel driving circuits in front of the $n^{th}$ row of pixel driving circuits.

As shown in FIG. 16, each row of sub-pixels corresponds to one first emission control signal line (EM1 line), each row of sub-pixels corresponds to one second emission control signal line (EM2 line), and each row of sub-pixels corresponds to one second scanning signal line (VR line). That is, the sub-pixels in the same row are electrically connected with the same first emission control signal line (EM1 line), the sub-pixels in the same row are electrically connected with the same second emission control signal line (EM2 line), and the sub-pixels in the same row are electrically connected with the same second scanning signal line (VR line).

In an exemplary embodiment, the VR signal not only may be generated by a driver chip and transmitted to various rows of pixel driving circuits, but also may be generated by the shifting register and transmitted to various rows of pixel driving circuits. An EM input module supplies an EM1 signal and an EM2 signal to various rows, where the EM1 signal is complex, and an example, in which the EM1 signal is generated and provided by the driver chip IC, is used for explanation in the specification; and in addition, the EM2 signal is simple in timing sequence, which not only may be generated by the driver chip and transmitted to various rows of pixel driving circuits, but also may be generated by the shifting register (EOA) and transmitted to various rows of pixel driving circuits.

In the embodiment of the present disclosure, the pixel driving circuit may utilize gate driving signals provided by different rows of gate lines, so that a number of external signal lines required by the pixel driving circuit is less, and types and the number of shifting registers externally connected with the pixel driving circuit are significantly reduced, thus being beneficial for preparing a display device with a narrow bezel.

In at least one embodiment of the present disclosure, the first reset signal line includes a reference signal line (Ref line), the second reset signal line includes an initialization signal line (Vinit line). An absolute value of a difference between a voltage Vref of a reference signal transmitted through the reference signal line (Ref line) and a voltage Vinit of an initialization signal transmitted through the initialization signal line (Vinit line) is greater than a threshold voltage (Vth) of the driving transistor.

In the embodiment of the present disclosure, in a signal reset stage, the reset sub-circuit 1 resets the voltage of the first node NS under the control of the first scanning signal VG(n−4), and resets the voltage of the second node NG under the control of the second scanning signal VR, meanwhile, the reset sub-circuit 1 sets the absolute value of the difference between the voltage Vref of the reference signal transmitted through the reference signal line (Ref line) and the voltage Vinit of the initialization signal transmitted through the initialization signal line (Vinit line) to be greater than the threshold voltage (Vth) of the driving transistor, so that the driving transistor MD is ensured to be turned on. As shown in FIG. 1 and FIG. 2, electrically connected electrodes of the first capacitor C1 and the second capacitor C2 in the storage sub-circuit 6 can also be pre-charged to prevent threshold compensation from being failed in a compensation stage of the pixel driving circuit due to a large capacitance to be charged, which improves a compensation effect of the threshold voltage of the driving transistor in a subsequent compensation stage.

In an exemplary embodiment, when the driving transistor MD is a N-type transistor, the voltage Vref of the reference signal transmitted through the reference signal line (Ref line) is greater than the voltage Vinit of the initialization signal transmitted through the initialization signal line (Vinit line).

In an exemplary embodiment, when the driving transistor MD is a P-type transistor, the voltage Vref of the reference signal transmitted through the reference signal line (Ref line) is less than the voltage Vinit of the initialization signal transmitted through the initialization signal line (Vinit line).

In an exemplary embodiment, the reference signal transmitted through the reference signal line (Ref line) is a signal with a constant voltage, and the initialization signal transmitted through the initialization signal line (Vinit line) is another signal with a constant voltage.

Figure 17:
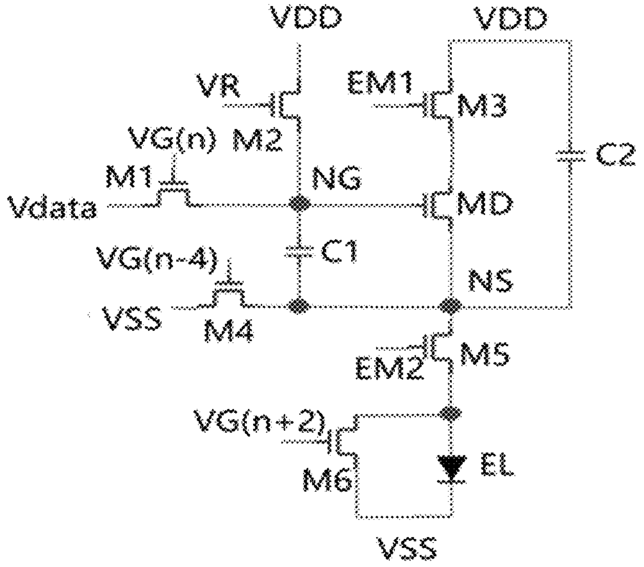
FIG. 17 is a schematic structural diagram of a fourth pixel driving circuit provided by an embodiment of the present disclosure.

In at least one embodiment of the present disclosure, as shown in FIG. 17, the first reset signal line includes the first power supply line (VDD line), that is, the first electrode of the second transistor M2 is electrically connected with the first power supply line (VDD line); the second reset signal line includes the second power supply line (VSS line), that is, the first electrode of the fourth transistor M4 is electrically connected with the second power supply line (VSS line).

In the embodiment of the present disclosure, the first reset signal line includes the first power supply line (VDD line) and the second reset signal line includes the second power supply line (VSS line), so that the number of the external signal lines of the pixel driving circuit can be further reduced, circuits and wiring in the display device can be simplified, a design space can be saved, and the difficulty of preparation process can be reduced, thus being beneficial for applying in the display device with a narrow bezel.

In at least one embodiment of the present disclosure, as shown in FIG. 1, the data writing sub-circuit 2 includes a first transistor M1. The gate of the first transistor M1 is electrically connected with the third scanning signal line (the $n^{th}$ gate line), a first electrode of the first transistor M1 is electrically connected with the data line (Date line), and a second electrode of the first transistor M1 is electrically connected with the gate of the driving transistor MD through the second node NG. The first transistor M1 is configured to transmit and write the data signal into the gate of the driving transistor MD in response to the third scanning signal.

Figure 18:
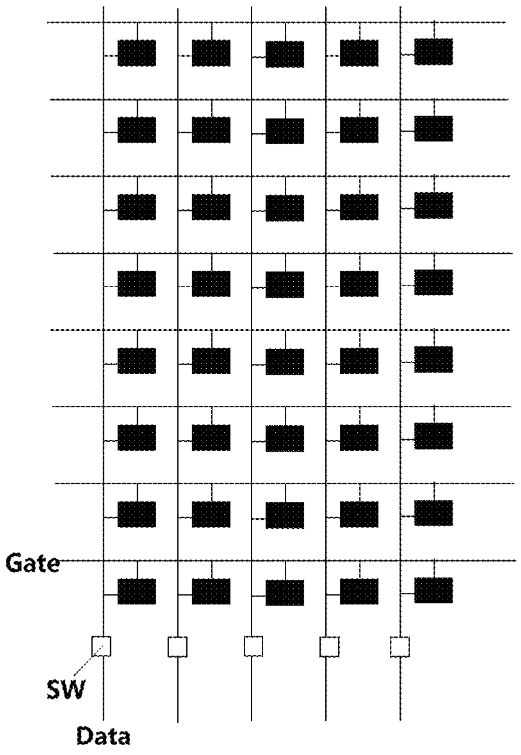
FIG. 18 is a schematic diagram illustrating a circuit connection of a display device provided by an embodiment of the present disclosure.
Figure 19:
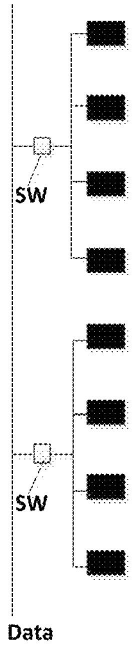
FIG. 19 is a schematic diagram illustrating another circuit connection of the display device provided by an embodiment of the present disclosure.

In at least one embodiment of the present disclosure, a switching transistor SW is also arranged in series between the data line (Data line) and the first transistor M1 of the pixel driving circuit (black rectangles in FIG. 18 or FIG. 19 represent the pixel driving circuits), and the switching transistor SW is configured to write a data signal Vdata into the data line (Data line) before the first transistor M1 is turned on.

Illustratively, as shown in FIG. 18, in order to improve an aperture ratio, the switching transistor SW is arranged at a boundary place between the display region and a binding region of the display device. A Source driving IC is arranged in the binding region. All data lines (Data line) are electrically connected with the Source driving IC through the switching transistor SW, and the Source driving IC is used for providing the data signal to the display region of the display device.

Illustratively, as shown in FIG. 19, for a column of pixel driving circuits, one common switching transistor SW may be arranged between the first transistors M1 of the plurality of pixel driving circuits and the data line (Data line). Taking a connection structure shown in FIG. 19 as an example, four pixel driving circuits may be electrically connected with the data line (Data line) through the same switching transistor SW. Before the respective first transistors M1 in the four pixel driving circuits are turned on, the data signal Vdata may be written into a first electrode (or a second electrode) of the switching transistor SW in advance by controlling the switching transistor SW, thus shortening a transmission path and transmission time of the data signal.

It should be noted that the number of switching transistors SW electrically connected with the same data line (Data line) is not limited herein, which may be specifically designed according to the requirements for the design space and the transmission time of the data signal.

As shown in FIG. 19, when the same data line (Date line) is connected with a plurality of switching transistors SW, at least a part of the switching transistors SW may be arranged in the display region AA, for example, arranging at least a part of the switching transistors SW in a non-aperture region of the display region AA.

An aperture region refers to a region where light is actually displayed in the display region AA; and the non-aperture region refers to a region in the display region AA other than the aperture region, which is usually used for wiring and arranging circuit structures.

In an embodiment of the present disclosure, a switching transistor SW is arranged in series between the data line (Date line) and the first transistor M1 of the pixel driving circuit (black rectangles in FIG. 18 represent the pixel driving circuits), so that the data signal Vdata may be written into the data line (Date line) in advance by turning on the switching transistor SW before the first transistor M1 is turned on, and the data signal Vdata can be quickly written into the gate of the driving transistor MD after the first transistor M1 is turned on. In this way, the time used for transmitting the data signal Vdata into the pixel driving circuit is shortened, a refresh speed and a response speed of the pixel driving circuit are increased, and a display effect of the display device is improved.

In at least one embodiment of the present disclosure, as shown in FIG. 2, the data writing sub-circuit 2 includes a first transistor M1 and a seventh transistor M7. The gate of the first transistor M1 is electrically connected with the third scanning signal line (the $n^{th}$ gate line), the first electrode of the first transistor M1 is electrically connected with the data line (Date line), and the second electrode of the first transistor M1 is electrically connected with the first electrode of the seventh transistor M7. The gate of the seventh transistor M7 is electrically connected with the second scanning signal line (VR line), and the second electrode of the seventh transistor M7 is electrically connected with the gate of the driving transistor MD through the second node NG.

In an exemplary embodiment, types of the first transistor M1 and the seventh transistor M7 are opposite. For example, the first transistor M1 is a N-type transistor and the seventh transistor M7 is a P-type transistor; and for another example, the first transistor M1 is a P-type transistor and the seventh transistor M7 is a N-type transistor. Timing sequence charts provided by the embodiment of the present disclosure and the following descriptions all correspond to the example that the first transistor M1 is the N-type transistor and the seventh transistor M7 is the P-type transistor.

In an exemplary embodiment, the first transistor M1 and the seventh transistor M7 are not synchronously turned on in some time periods, and the first transistor M1 and the seventh transistor M7 are synchronously turned in some time periods.

In an exemplary embodiment, the first transistor M1 may be controlled to be turned on, and the seventh transistor M7 may be controlled to be turned off, so that the data signal Vdata transmitted through the data line (Date line) is written into a place between the first transistor M1 and the seventh transistor M7 as shown in FIG. 2 in advance. When the first transistor M1 and the seventh transistor M7 are turned on at the same time, the data signal Vdata can be quickly written into the gate of the driving transistor MD through the seventh transistor M7. In this way, the time used for transmitting the data signal Vdata is shortened, a refresh speed and a response speed of the pixel driving circuit are increased, and a display effect of the display device is improved.

In at least one embodiment of the present disclosure, as shown in FIG. 1 or FIG. 2, the reset sub-circuit 1 includes a second transistor M2 and a fourth transistor M4.

A gate of the second transistor M2 is electrically connected with the second scanning signal line (for example, the VR line), a first electrode of the second transistor M2 is electrically connected with the first reset signal line (for example, the Ref line), and a second electrode of the second transistor M2 is electrically connected with the gate of the driving transistor MD through the second node NG. A gate of the fourth transistor M4 is electrically connected with the first scanning signal line (for example, the $(n-4)^{th}$ gate line), a first electrode of the fourth transistor M4 is electrically connected with the second reset signal line (for example, the Vinit line), and a second electrode of the fourth transistor M4 is electrically connected with the first node NS.

In an exemplary embodiment, under the control of the second scanning signal VR transmitted through the second scanning signal line (for example, the VR line), the second transistor M2 resets the voltage of the second node NG electrically connected with the gate of the driving transistor MD according to the reset signal (for example, the reference signal Vref) transmitted through the first reset signal line (for example, the Ref line).

In an exemplary embodiment, under the control of the first scanning signal (for example, the VG(n−4) signal) transmitted through the first scanning signal line (for example, the $(n-4)^{th}$ gate line), the fourth transistor resets the first node NS electrically connected with the second electrode of the driving transistor MD according to the second reset signal (for example, the Vinit signal) transmitted through the second reset signal line (for example, the Vinit line).

In the embodiment of the present disclosure, before various pixel driving circuits for one row of sub-pixels are refreshed (rewriting new signals), voltages of key nodes (for example, the first node NS electrically connected with the source of the driving transistor MD and the second node NG electrically connected with the gate of the driving transistor MD) in the pixel driving circuits may be reset through the second transistor M2 and the fourth transistor M4, so as to eliminate a residual signal in a previous frame, thus avoiding a ghost shadow in the next frame. Therefore, when the pixel driving circuit is applied in the display device, a display effect of the display device can be improved.

In at least one embodiment of the present disclosure, as shown in FIG. 1 or FIG. 2, the first emission control sub-circuit 4 includes a third transistor M3.

A gate of the third transistor M3 is electrically connected with the first emission control signal line EM1, a first electrode of the third transistor M3 is electrically connected with the first power supply line (VDD line), and a second electrode of the third transistor M3 is electrically connected with the third node A.

In an exemplary embodiment, the third transistor M3 is configured to, under the control of the first emission control signal EM1 transmitted through the first emission control signal line EM1, transmit the first power supply signal VDD of the first power supply line (VDD line) to the first electrode (for example, the source) of the driving transistor MD through the third node A.

In at least one embodiment of the present disclosure, as shown in FIG. 1 or FIG. 2, the second emission control sub-circuit 5 includes a fifth transistor M5.

A gate of the fifth transistor M5 is electrically connected with the second emission control signal line EM2 line, a first electrode of the fifth transistor M5 is electrically connected with the first node NS, and a second electrode of the fifth transistor M5 is electrically connected with the anode of the light emitting device 8.

In an exemplary embodiment, when the first power supply signal VDD transmitted through the first power supply line (VDD line) is transmitted to the first electrode (for example the source) of the driving transistor MD through the third node A, the fifth transistor M5 is configured to, under the control of the second emission control signal EM2 transmitted through the second emission control signal line EM2, transmit the driving current generated by the driving transistor MD to the anode of the light emitting device 8.

In at least one embodiment of the present disclosure, as shown in FIG. 1 or FIG. 2, the storage sub-circuit 6 includes a first capacitor C1 and a second capacitor C2.

A first electrode of the first capacitor C1 is electrically connected with the second node NG, and a second electrode of the first capacitor C1 is electrically connected with the first node NS. A first electrode of the second capacitor C2 is electrically connected with the first power supply line (VDD line), and a second electrode of the second capacitor C2 is electrically connected with the second electrode of the first capacitor C1 through the first node NS.

Capacitance values of the first capacitor C1 and the second capacitor C2 are not limited herein.

In some embodiments, the driving current of the driving transistor MD may be adjusted by adjusting a ratio of the capacitance values of the first capacitor C1 and the second capacitor C2.

In some other embodiments, a capacitance value of the first capacitor C1 may be set to be greater than a capacitance value of the second capacitor C2, so as to have less influence on the voltage of the gate of the driving transistor MD when a voltage value of the data signal Vdata is changed greatly, thus having less influence on the driving current of the driving transistor MD (that is, the driving current of the driving transistor MD is changed slightly).

In the embodiment of the present disclosure, the voltage of the second node NG may be stabilized by arranging the first capacitor C1, and the voltage of the first node NS may be stabilized by arranging the second capacitor C2. By adjusting the ration of the capacitance values of the first capacitor C1 and the second capacitor C2, a greatly changed data signal Vdata may bring a slightly changed driving current, so that the driving current may be controlled more accurately, and a gray scale of display of the display device may be adjusted and displayed more finely, thus improving the display effect of the display device.

In at least one embodiment of the present disclosure, as shown in FIG. 1 or FIG. 2, the reset sub-circuit 7 includes a sixth transistor M6.

A gate of the sixth transistor M6 is electrically connected with the fourth scanning signal line (for example, the $(n+2)^{th}$ gate line), a first electrode of the sixth transistor M6 is electrically connected with the anode of the light emitting device 8, and a second electrode of the sixth transistor M6 is electrically connected with the second power supply line (VSS line) and the cathode of the light emitting device 8 respectively.

In an exemplary embodiment, the sixth transistor M6 is configured to, under the control of the fourth scanning signal transmitted through the fourth scanning signal line (for example, the $(n+2)^{th}$ gate line), transmit the second power supply signal VSS transmitted through the second power supply line (VSS line) to the anode of the light emitting device 8, so that the anode of the light emitting device 8 is reset through the second power supply line (VSS line) before the light emitting device 8 emits light.

Illustratively, the second power supply line (VSS line) may be electrically connected with a ground terminal GND.

In at least one embodiment of the present disclosure, as shown in FIG. 1, when the data writing sub-circuit 2 includes the first transistor M1, the first transistor M1, the second transistor M2, the third transistor M3, the fourth transistor M4, the fifth transistor M5, the sixth transistor M6 and the driving transistor MD are all N-type transistors.

As shown in FIG. 2, when the data writing sub-circuit 2 includes the first transistor M1 and the seventh transistor M7, the first transistor M1, the second transistor M2, the third transistor M3, the fourth transistor M4, the fifth transistor M5, the sixth transistor M6 and the driving transistor MD are all N-type transistors, and the seventh transistor M7 is a P-type transistor.

Types of the first transistor M1 and the seventh transistor M7 are opposite, the first transistor M1 and the seventh transistor M7 are not synchronously turned on in some time periods, and the first transistor M1 and the seventh transistor M7 are synchronously turned on in some time periods.

In at least one embodiment of the present disclosure, when the driving transistor is the N-type transistor, the voltage Vref of the reference signal is greater than the voltage Vinit of the initialization signal.

In at least one embodiment of the present disclosure, the absolute value of the difference between the voltage Vref of the reference signal and the voltage Vinit of the initialization signal ranges from 2 V to 4 V.

For example, the absolute value of the difference between the voltage Vref of the reference signal and the voltage Vinit of the initialization signal is 2.3 V, 2.5 V, 2.8 V, 3 V, 3.3 V, 3.5 V or 3.8 V.

In the embodiment of the present disclosure, in the signal reset stage, the absolute value of the difference between the voltage Vref of the reference signal and the voltage Vinit of the initialization signal is set to be in a range 2 V to 4 V, so that the driving transistor MD is ensured to be turned on, as shown in FIG. 1 and FIG. 2, electrically connected electrodes of the first capacitor C1 and the second capacitor C2 in the storage sub-circuit 6 can also be pre-charged to prevent threshold compensation from being failed in a compensation stage of the pixel driving circuit due to a large capacitance to be charged, which improves a compensation effect of the threshold voltage of the driving transistor in a subsequent compensation stage.

In at least one embodiment of the present disclosure, as shown in FIG. 3 and FIG. 4, a rising edge of a pulse signal transmitted by the second scanning signal VR coincides with a rising edge of a pulse signal transmitted by the first scanning signal VG(n−4).

In some embodiments, as shown in FIG. 3, a falling edge of the pulse signal transmitted by the second scanning signal VR coincides with a rising edge of a pulse signal transmitted by the third scanning signal VG(n).

Alternatively, in some other embodiments, as shown in FIG. 4, the falling edge of the pulse signal transmitted by the second scanning signal VR is located behind the rising edge of the pulse signal transmitted by the third scanning signal VG(n).

In an embodiment of the present disclosure, referring to FIG. 3 and FIG. 1, when the first transistor M1, the second transistor M2, the third transistor M3, the fourth transistor M4, the fifth transistor M5, the sixth transistor M6 and the driving transistor MD are all the N-type transistors, and the seventh transistor M7 is the P-type transistor, the second scanning signal VR and the third scanning signal VG(n) are not high levels at the same time, so that the second transistor M2 and the first transistor M1 are not turned on at the same time. When the third scanning signal VG(n) is a high level, the data signal Vdata is written into the pixel driving circuit.

In an embodiment of the present disclosure, referring to FIG. 4 and FIG. 2, when the first transistor M1, the second transistor M2, the third transistor M3, the fourth transistor M4, the fifth transistor M5, the sixth transistor M6 and the driving transistor MD are all the N-type transistors, and the seventh transistor M7 is the P-type transistor, the third scanning signal VG(n) is input in advance before the second scanning signal VR is changed as a low level (a position marked by a dotted rectangular box in FIG. 4), so that the first transistor M1 is turned on in advance, thus controlling the data signal Vdata to be written into a node between the first transistor M1 and the seventh transistor M7 in advance. In a period when the second scanning signal VR is the low level and the third scanning signal VG(n) is the high level, the first transistor M1 and the seventh transistor M7 are turned on at the same time, so that the data signal Vdata is transmitted from the first electrode of the seventh transistor M7 to the gate of the driving transistor MD through the second node NG to realize writing of the data signal. In this way, the time used for transmitting the data signal Vdata to the pixel driving circuit is shortened, the refresh speed and the response speed of the pixel driving circuit are increased, and the display effect of the display device is improved.

In at least one embodiment of the present disclosure, as shown in FIG. 3 and FIG. 4, scanning time of the third scanning signal VG(n) is greater than scanning time of the second scanning signal VR. It can be understood that a pulse width of the third scanning signal VG(n) is greater than a pulse width of the second scanning signal VR.

It should be noted that, in the timing sequence charts shown in FIG. 3 and FIG. 4, lengths of signal lines only indicate different time periods instead of representing durations of time periods.

In the embodiment of the present disclosure, the scanning time of the third scanning signal VG(n) is set to be greater than the scanning time of the second scanning signal VR, so that writing time of the data signal Vdata can be increased to a great extent, as shown in FIG. 1 or FIG. 2, thus increasing charging time of the first electrode (the electrode electrically connected with the second node NG) of the first capacitor C1, which is more beneficial for stabilizing the voltage of the first capacitor C1 relative to the second node NG (and the gate of the driving transistor MD) subsequently, and the driving stability of the pixel driving circuit is improved.

In at least one embodiment of the present disclosure, as shown in FIG. 4, an overlapping time of the first emission control signal EM1 and the second scanning signal VR is greater than an overlapping time of the third scanning signal VG(n) and the second scanning signal VR.

In the embodiment of the present disclosure, as shown in FIG. 2 and FIG. 4, when the first emission control signal EM1 and the second scanning signal VR are both high levels, the second transistor M2 and the third transistor M3 are turned on. At this time, the voltage of the second node NG is the voltage Vref of the reference signal, the driving transistor MD is turned on, the voltage of the first node NS is the voltage Vinit of the initialization signal, the path between the first power supply line (VDD line) and the first node NS is conductive, and the first power supply line (VDD line) charges the second node NS. When a potential of the first node NS is changed as Vref-Vth (Vth is a threshold voltage of a driving TFT MD), the driving transistor MD is turned off. At this time, the potential of the first node NS is the Vref-Vth, and because this process is changed slowly and a potential of the second node NG is always pulled by the voltage Vref of the reference signal, the potential of the second node NG is kept at Vref, thus completing the reading of the threshold voltage Vth of the driving transistor MD.

In the embodiment of the present disclosure, the overlapping time of the first emission control signal EM1 and the second scanning signal VR is set to be greater than the overlapping time of the third scanning signal VG(n) and the second scanning signal VR, so that charging time of the second node NS by the first power supply line (VDD line) can be effectively increased, and the threshold voltage Vth of the driving transistor MD is read more accurately, which is convenient for more accurately compensating the threshold voltage Vth of the driving transistor MD subsequently.

In at least one embodiment of the present disclosure, as shown in FIG. 3 or FIG. 4, the first emission control signal EM1 includes a first pulse signal and a second pulse signal, the second emission control signal EM2 includes a third pulse signal, and the second pulse signal coincides with the third pulse signal.

In at least one embodiment of the present disclosure, a capacitance value of the second capacitor C2 is less than a capacitance value of the first capacitor C1.

In the embodiment of the present disclosure, the capacitance value of the second capacitor C2 is set to be less than the capacitance value of the first capacitor C1, so that a greatly changed data signal Vdata may bring a slightly changed driving current. When a low-resolution Source IC in the related art is used, the driving current may be controlled more accurately, and a gray scale of display of the display device may be adjusted and displayed more finely, thus improving the display effect of the display device.

In at least one embodiment of the present disclosure, for the pixel driving circuit shown in FIG. 1, the first transistor M1, the second transistor M2, the fourth transistor M4 and the fifth transistor M5 may all be provided as double-gate transistors, and two gates of the same transistor are electrically connected together; or, the first transistor M1, the second transistor M2, the fourth transistor M4 and the fifth transistor M5 are all metal oxide transistors.

In at least one embodiment of the present disclosure, for the pixel driving circuit shown in FIG. 2, the seventh transistor M7, the second transistor M2, the fourth transistor M4 and the fifth transistor M5 may all be set as double-gate transistors; and two gates of the same transistor are electrically connected together; or, the seventh transistor M7, the second transistor M2, the fourth transistor M4 and the fifth transistor M5 are all metal oxide transistors.

Figure 10:
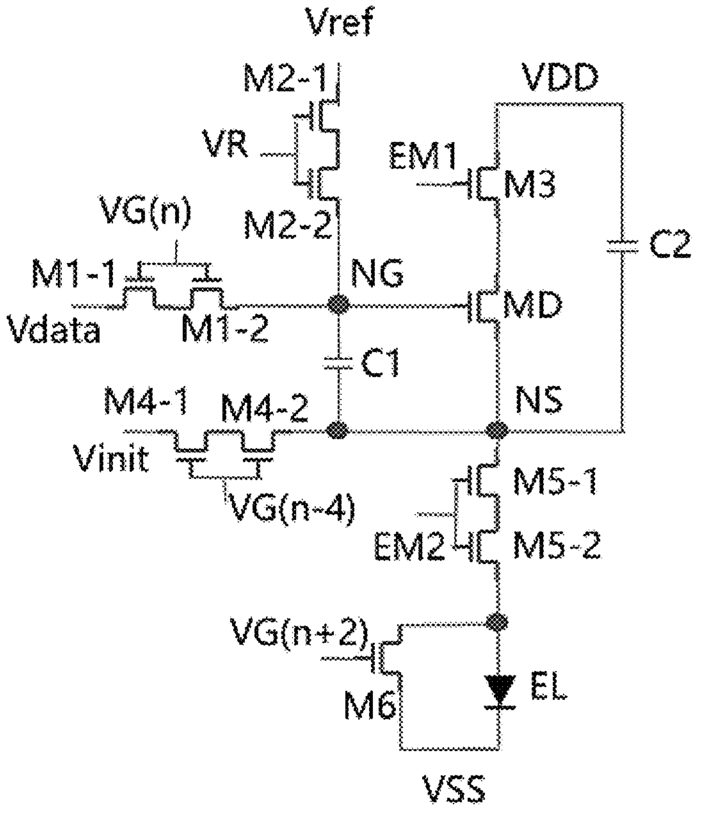
FIG. 10 is a schematic structural diagram of a third pixel driving circuit provided by an embodiment of the present disclosure.
Figure 11:
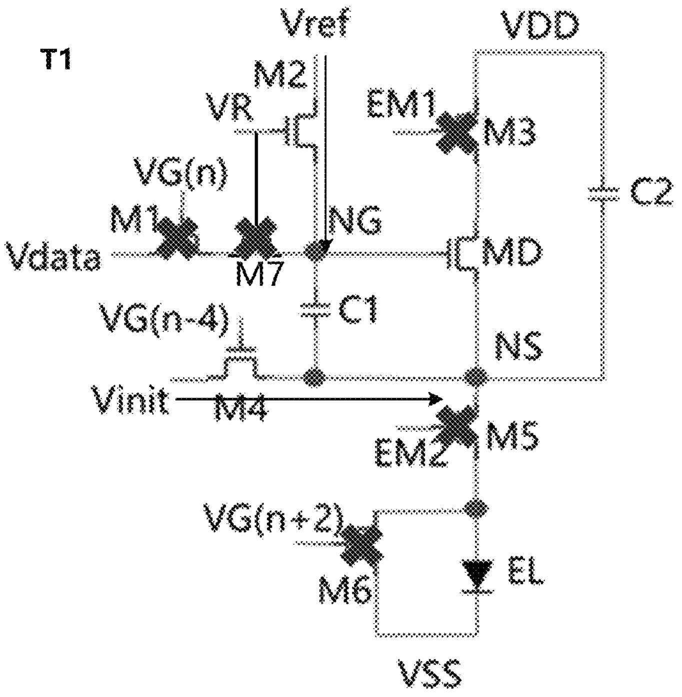
FIG. 11 to FIG. 15 are diagrams illustrating device states in different stages, according to the timing sequence chart shown in FIG. 4, of the pixel driving circuit shown in FIG. 2 provided by the embodiment of the present disclosure.
Figure 12:
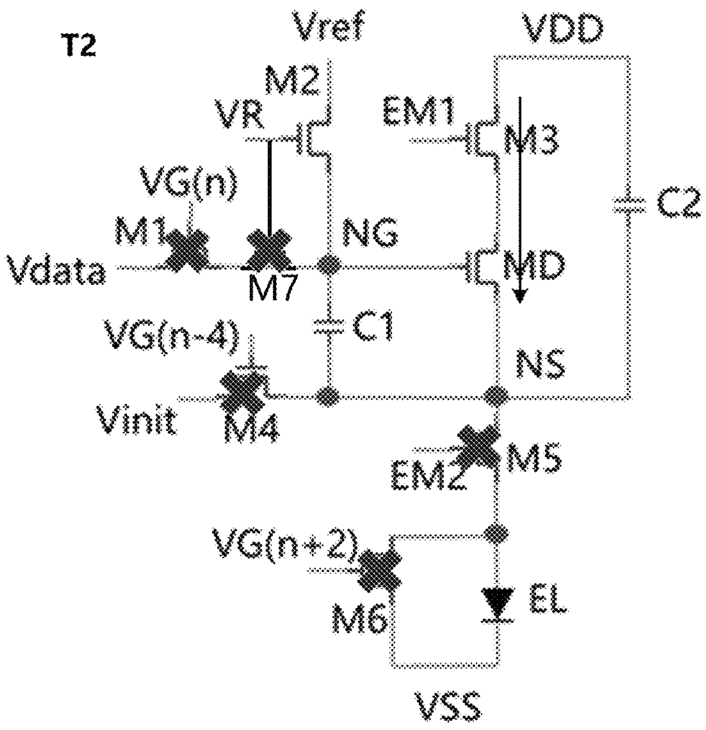

In the embodiment of the present disclosure, during the operation of the pixel circuit, the transistors and the light emitting device may inevitably leak electricity, thus affecting compensation and light emitting effects. Therefore, the transistors around the key nodes (for example the transistors around the NS and NG nodes) may be designed with double gates. As shown in FIG. 10, the first transistor M1, the second transistor M2, the fourth transistor M4 and the fifth transistor M5 are all double-gate transistors (or) metal oxide transistors, which can significantly reduce the electricity leakage of the transistors around the key nodes, thus improving the display effect of the display device.

In at least one embodiment of the present disclosure, the driving transistor MD is a double-gate transistor, one gate of the driving transistor is electrically connected with the second node NG, the other gate of the driving transistor MD is electrically connected with a signal input end with a constant voltage, and the constant voltage is less than a threshold voltage of the driving transistor MD.

In the embodiment of the present disclosure, one gate of the driving transistor MD is electrically connected with the second node NG, and used for controlling the driving transistor MD to be turned on or turned off; and the other gate of the driving transistor is electrically connected with a signal input end with a constant voltage, and used for stabilizing a threshold voltage of the driving transistor MD to improve the driving stability of the driving transistor MD. The voltage provided by the signal input end with the constant voltage cannot interfere with the on and off states of the driving transistor MD, and an absolute value of the constant voltage is set to be less than an absolute value of the threshold voltage of the driving transistor MD.

In at least one embodiment of the present disclosure, the light emitting device 8 includes an organic Light emitting diode (OLED), a micro Light emitting diode (Micro LED) or a mini Light emitting diode (Mini LED).

An embodiment of the present disclosure provides a display device including any one of the pixel driving circuits described above.

The display device may be an organic Light emitting diode (OLED) display device, a micro Light emitting diode (Micro LED) display device or a mini Light emitting diode (Mini LED) display device.

The display device may include any device or product with a display function. For example, the display device may be a smart phone, a mobile phone, an e-book reader, a desktop computer (PC), a laptop PC, a netbook PC, a personal digital assistant (PDA), a portable multimedia player (PMP), a digital audio player, a mobile medical device, a camera, a wearable device (such as a head-mounted device, an electronic dress, an electronic bracelet, an electronic necklace, an electronic accessory, an electronic tattoo, or an electronic watch), a television, and the like.

According to the display device provided by the embodiment of the present disclosure, the display device includes the pixel driving circuit described above. By setting the transistors, the capacitors and the timing sequence signals in the pixel driving circuit, the anode of the light emitting device 8 can be separated from the second electrode (for example, the source) of the driving transistor MD. Therefore, the light emitting device 8 itself (the drift of the threshold voltage and the coupling of the capacitance in the circuit) will not affect a potential change of the source of the driving transistor MD before a light emitting stage. Meanwhile, the second capacitor C2 is arranged to ensure the stable potential of the NS node, thus ensuring the compensation effect. In addition, by setting the capacitance values of the C2 and the C1, the gray scale of display may be richer when the pixel driving circuit drives the Micro LED and Mini LED light emitting devices. Finally, the pixel driving circuit may utilize gate driving signals provided by different gate lines, so that the number of external signal lines required is small, and types and the number of shifting registers externally connected with the pixel driving circuits are significantly reduced, thus being beneficial for preparing a display device with a narrow bezel.

An embodiment of the present disclosure provides a driving method used for driving any of the pixel driving circuits described above. The driving method includes steps described below.

At S801, in a first stage, for example T1 stage shown in FIG. 3 or FIG. 4, a first emission control signal EM1 at low level is supplied to the first emission control signal line, a second emission control signal EM2 at low level is supplied to the second emission control signal line, a first scanning signal VG(n−4) at high level is supplied to the first scanning signal line, a second scanning signal VR at high level is supplied to the second scanning signal line, a third scanning signal VG(n) at low level is supplied to the third scanning signal line, and a fourth scanning signal VG(n+2) at low level is supplied to the fourth scanning signal line.

At S802, in a second stage, for example T2 stage shown in FIG. 3 or FIG. 4, a first emission control signal EM1 at high level is supplied to the first emission control signal line, a second emission control signal EM2 at low level is supplied to the second emission control signal line, a first scanning signal VG(n−4) at low level is supplied to the first scanning signal line, a second scanning signal VR at high level is supplied to the second scanning signal line, a third scanning signal VG(n) at low level is supplied to the third scanning signal line, and a fourth scanning signal VG(n+2) at low level is supplied to the fourth scanning signal line.

At S803, in a third stage, for example T3 stage shown in FIG. 3 or FIG. 4, a first emission control signal EM1 at low level is supplied to the first emission control signal line, a second emission control signal EM2 at low level is supplied to the second emission control signal line, a first scanning signal VG(n−4) at low level is supplied to the first scanning signal line, a second scanning signal VR at low level is supplied to the second scanning signal line, a third scanning signal VG(n) at high level is supplied to the third scanning signal line, and a fourth scanning signal VG(n+2) at low level is supplied to the fourth scanning signal line.

At S804, in a fourth stage, for example T4 stage shown in FIG. 3 or FIG. 4, a first emission control signal EM1 at low level is supplied to the first emission control signal line, a second emission control signal EM2 at low level is supplied to the second emission control signal line, a first scanning signal VG(n−4) at low level is supplied to the first scanning signal line, a second scanning signal VR at low level is supplied to the second scanning signal line, a third scanning signal VG(n) at low level is supplied to the third scanning signal line, and a fourth scanning signal VG(n+2) at high level is supplied to the fourth scanning signal line.

At S805, in a fifth stage, for example T5 stage shown in FIG. 3 or FIG. 4, a first emission control signal EM1 at high level is supplied to the first emission control signal line, a second emission control signal EM2 at high level is supplied to the second emission control signal line, a first scanning signal VG(n−4) at low level is supplied to the first scanning signal line, a second scanning signal VR at low level is supplied to the second scanning signal line, a third scanning signal VG(n) at low level is supplied to the third scanning signal line, and a fourth scanning signal VG(n+2) at low level is supplied to the fourth scanning signal line.

According to the driving method of the pixel driving circuit provided by the embodiment of the present disclosure, during the driving of the circuit, the drift problem of the threshold voltage of the driving transistor can be improved, and because the anode of the light emitting device 8 in the pixel driving circuit is separated from (not directly electrically connected with) the second electrode (for example the source) of the driving transistor MD, the light emitting device 8 itself (the drift of the threshold voltage and the coupling of the capacitance in the circuit) will not affect a potential change of the source of the driving transistor MD before a light emitting stage. Meanwhile, the second capacitor C2 is arranged to ensure the stable potential of the NS node, thus ensuring the compensation effect. In addition, by setting the capacitance values of the C2 and the C1, the gray scale of display may be richer when the pixel driving circuit drives the Micro LED and Mini LED light emitting devices. Finally, the pixel driving circuit may utilize gate driving signals provided by different gate lines, so that the number of external signal lines required is small, and types and a number of shifting registers externally connected with the pixel driving circuit are significantly reduced, thus being beneficial for preparing a display device with a narrow bezel.

The circuit diagram shown in FIG. 1 is taken as an example hereinafter, and a driving principle and a driving process of the driving circuit are specifically described by taking all transistors being the N-type transistors as an example. FIG. 3 provides a time sequence corresponding to the circuit diagram in FIG. 1; and FIG. 5 to FIG. 9 respectively show circuit states of the circuit diagram in FIG. 1 in different stages of the timing sequence shown in FIG. 3. In FIG. 5 to FIG. 9, a transistor that is turned off is marked with "X".

In the first stage (the reset stage), for example the T1 stage shown in FIG. 3, the first emission control signal EM1 at low level is supplied to the first emission control signal line, the second emission control signal EM2 at low level is supplied to the second emission control signal line, the first scanning signal VG(n−4) at high level is supplied to the first scanning signal line, the second scanning signal VR at high level is supplied to the second scanning signal line, the third scanning signal VG(n) at low level is supplied to the third scanning signal line, and the fourth scanning signal VG(n+2) at low level is supplied to the fourth scanning signal line.

Figure 5:
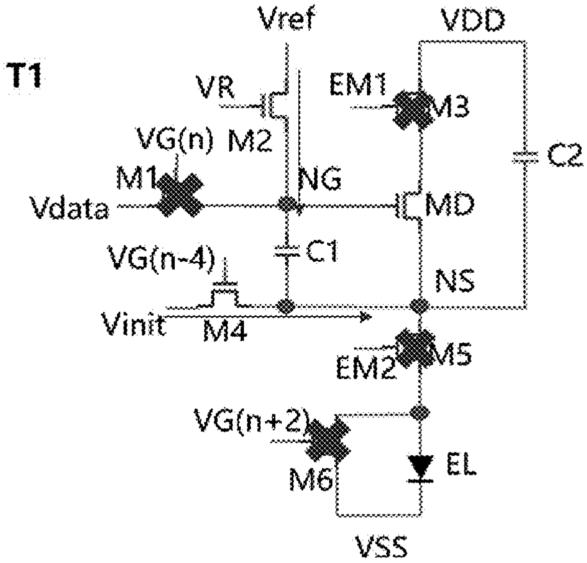
FIG. 5 to FIG. 9 are diagrams illustrating device states in different stages, according to the timing sequence chart shown in FIG. 3, of the pixel driving circuit shown in FIG. 1 provided by the embodiment of the present disclosure.

At this time, as shown in FIG. 3 and FIG. 5, the second transistor M2 and the fourth transistor M4 are turned on, the potential of the first node NS is Vinit, and the potential of the second node NG is Vref. Because the Vref and the Vinit are both high level potentials with constant voltages, the driving transistor MD is turned on. In this way, the resetting of the potentials of the first node NS and the second node NG is completed. In addition, connected electrodes (electrode plates) of the first capacitor C1 and the second capacitor C2 are also pre-charged, so as to prevent the extraction and compensation of the threshold voltage from being failed in a subsequent extraction stage of the threshold voltage due to a large capacitance to be charged.

In the second stage (the extraction stage of the threshold voltage), for example the T2 stage shown in FIG. 3, the first emission control signal EM1 at high level is supplied to the first emission control signal line, the second emission control signal EM2 at low level is supplied to the second emission control signal line, the first scanning signal VG(n−4) at low level is supplied to the first scanning signal line, the second scanning signal VR at high level is supplied to the second scanning signal line, the third scanning signal VG(n) at low level is supplied to the third scanning signal line, and the fourth scanning signal VG(n+2) at low level is supplied to the fourth scanning signal line.

Figure 6:
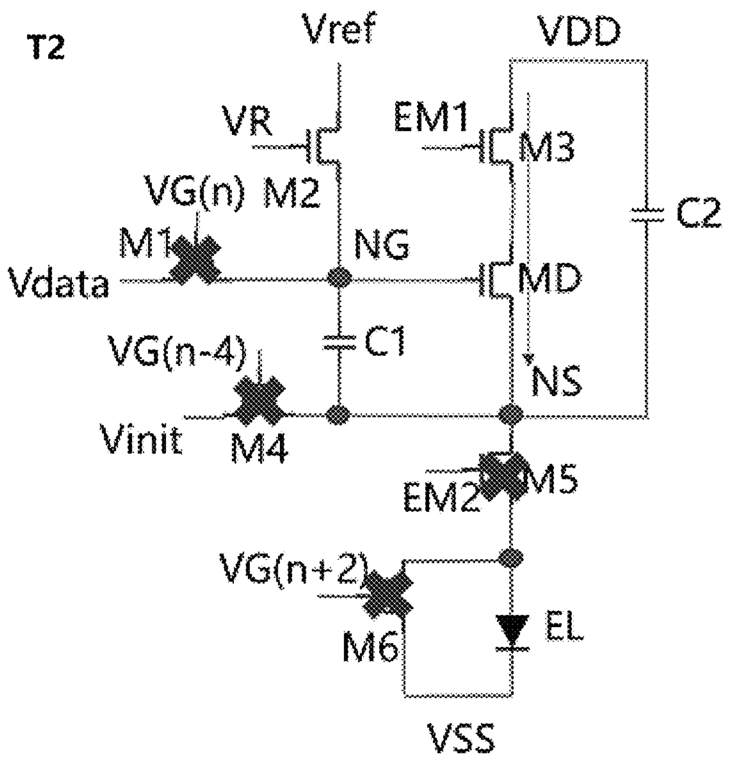

At this time, as shown in FIG. 3 and FIG. 6, the second transistor M2 and the third transistor M3 are turned on, the first capacitor C1 can keep the potential of the second node NG at Vref, the driving transistor MD is kept in an on state, a conductive path is formed between the first power supply line (VDD line) and the first node NS, and the first power supply line (VDD line) charges the second node NS. When the potential of the first node NS is changed as Vref-Vth, the driving transistor MD is turned off. Because this process is changed slowly and the potential of the second node NG is always pulled by Vref, the potential of the second node NG is kept at Vref. At this time, Vgs=Vref−(Vref−Vth)=Vth, thus completing the extraction of the threshold voltage Vth of the driving transistor MD.

In the third stage (the data writing and compensation stage), for example the T3 stage shown in FIG. 3, the first emission control signal EM1 at low level is supplied to the first emission control signal line, the second emission control signal EM2 at low level is supplied to the second emission control signal line, the first scanning signal VG(n−4) at low level is supplied to the first scanning signal line, the second scanning signal VR at low level is supplied to the second scanning signal line, the third scanning signal VG(n) at high level is supplied to the third scanning signal line, and the fourth scanning signal VG(n+2) at low level is supplied to the fourth scanning signal line.

Figure 7:
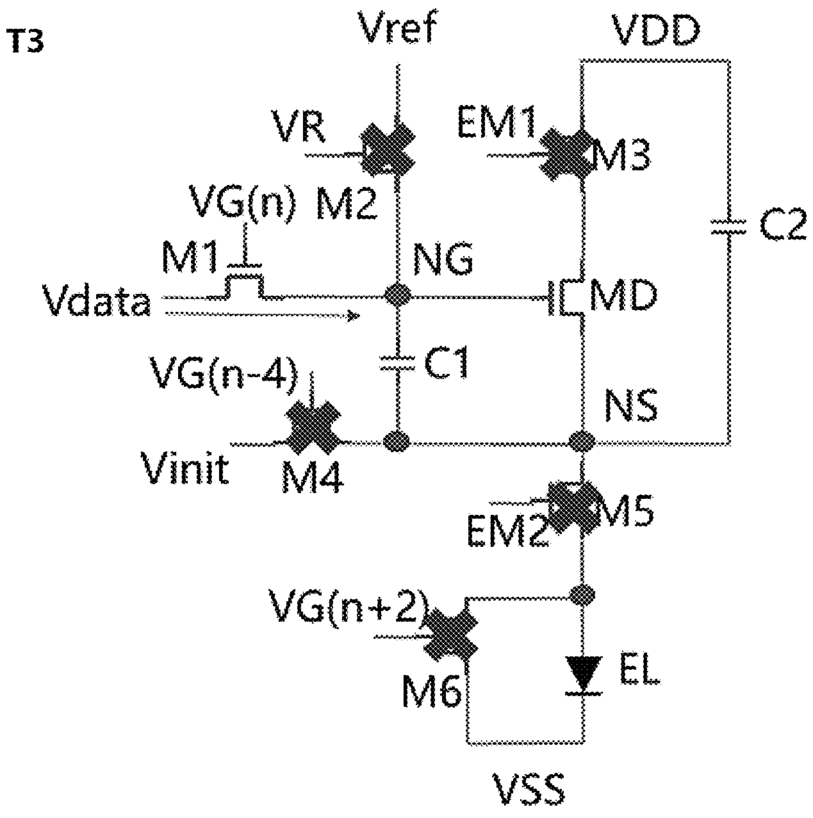

At this time, as shown in FIG. 3 and FIG. 7, the first transistor M1 is turned on, the potential of the second node NG is Vdata, and the driving transistor MD is turned on. The potential of the second node NG is changed from Vref in the previous stage into Vdata, the potential of the first node NS is changed as (Vdata−Vref)*C1/(C1+C2)+Vref−Vth due to a capacitive coupling effect, where C1 and C2 represent the capacitance values of the first capacitor and the second capacitor. In addition, because the fifth transistor M5 is turned off at this time, the potential of the first node NS will not be interfered by the potential of the anode of the light emitting device 8 and the IR Rise of the VSS in the second and third stages.

In the fourth stage (the reset stage), for example the T4 stage shown in FIG. 3, the first emission control signal EM1 at low level is supplied to the first emission control signal line, the second emission control signal EM2 at low level is supplied to the second emission control signal line, the first scanning signal VG(n−4) at low level is supplied to the first scanning signal line, the second scanning signal VR at low level is supplied to the second scanning signal line, the third scanning signal VG(n) at low level is supplied to the third scanning signal line, and the fourth scanning signal VG(n+2) at high level is input to the fourth scanning signal line.

Figure 8:
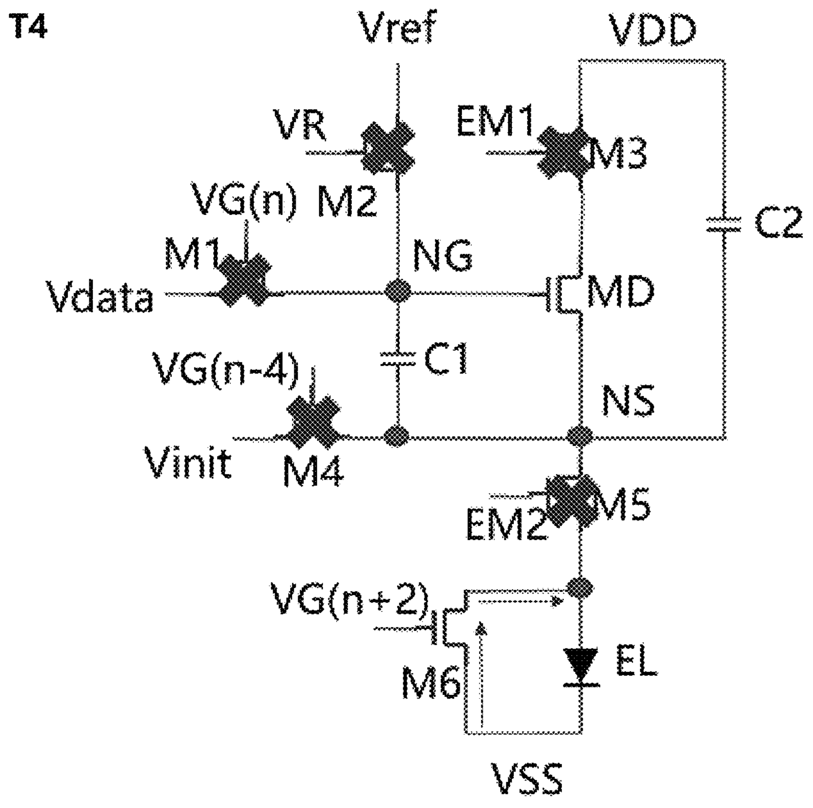

At this time, as shown in FIG. 3 and FIG. 8, the sixth transistor M6 is turned on. Moreover, under an action of the first capacitor C1, the potential of the second node NG is kept at Vdata, and the driving transistor MD is turned on. The potential of the second power supply line (VSS line) is written into the anode of the light emitting device 8 (marked with EM in FIG. 8) through the sixth transistor M6, so as to reset the potential of the anode, thus preventing the uneven potential of the anode of the light emitting device due to a technical process and other factors from adversely affecting an operating current of a pixel in the light emitting stage. In addition, because the fifth transistor M5 is turned off at this time, the reset of the potential of the anode of the light emitting device will not affect the potential of the first node NS that has been compensated, thus ensuring the compensation effect of the threshold voltage Vth of the driving transistor.

In the fifth stage, for example the T5 stage shown in FIG. 3, the first emission control signal EM1 at high level is supplied to the first emission control signal line, the second emission control signal EM2 at high level is supplied to the second emission control signal line, the first scanning signal VG(n−4) at low level is supplied to the first scanning signal line, the second scanning signal VR at low level is supplied to the second scanning signal line, the third scanning signal VG(n) at low level is supplied to the third scanning signal line, and the fourth scanning signal VG(n+2) at low level is supplied to the fourth scanning signal line.

Figure 9:
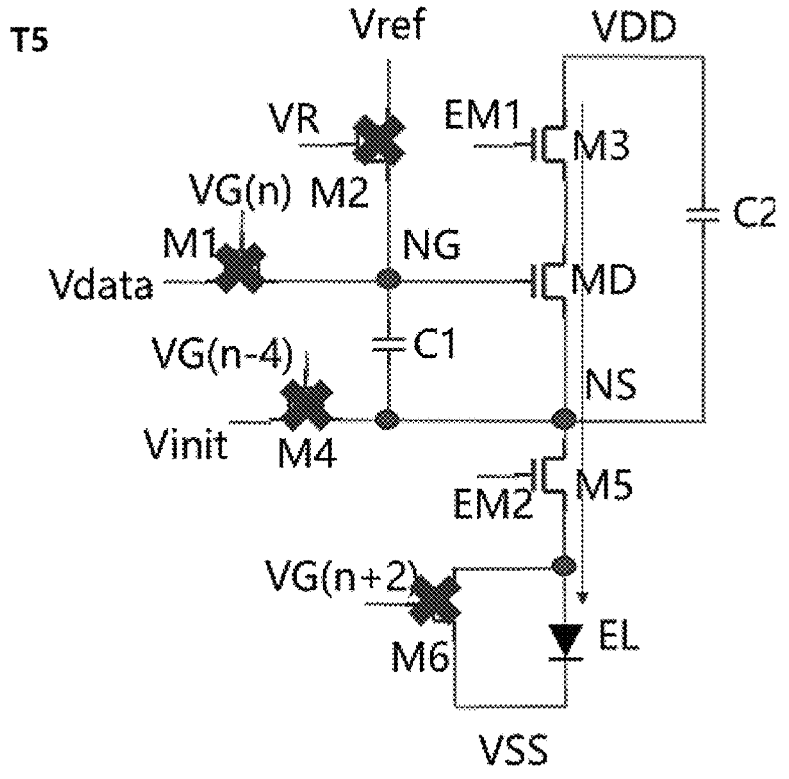

At this time, as shown in FIG. 3 and FIG. 9, the third transistor M3 and the fifth transistor M5 are turned on. Because the potential of the second node NG is kept at Vdata under the action of the first capacitor C1, the driving transistor MD is turned on. Therefore, a conductive path is formed between the first power supply line (VDD line) and the second power supply line (VSS line), and the light emitting device 8 (EL) emits light.

Because $Vg = Vdata$, $Vs = [C1(Vdata - Vref)/(C1 + C2) + Vref - Vth]$;

$$Vgs = Vdata - [C1(Vdata - Vref)/(C1 + C2) + Vref - Vth];$$

and $$Ids = k(Vgs - Vth)^2 = k[C2(Vdata - Vref)/(C1 + C2)]^2;$$

where k is a device parameter, and a carrier mobility and a channel aspect ratio of the driving transistor are related to the capacitance of the driving transistor. It can be seen that, in the light emitting stage, a magnitude of a driving current Ids has nothing to do with the threshold voltage Vth, the voltage of the first power supply signal VDD and the voltage of the second power supply signal VSS, so that the pixel driving circuit can avoid different potential changes in different sub-pixels caused by uneven threshold voltage Vth of the driving transistor MD and different resistances of the first power supply line (VDD line) and the second power supply line (VSS line), thus avoiding the problem of uneven image display in different regions of the display device, and improving the display effect.

The circuit diagram shown in FIG. 2 is taken as an example hereinafter, and a driving principle and a driving process of the driving circuit are specifically described by taking the seventh transistor being the P-type transistor and other transistors being the N-type transistors as an example. FIG. 4 provides a time sequence corresponding to the circuit diagram in FIG. 2; and FIG. 11 to FIG. 15 respectively show circuit states of the circuit diagram in FIG. 2 in different stages of the timing sequence shown in FIG. 4. In FIG. 11 to FIG. 15, the transistor that is turned off is marked with "X".

It should be noted that, in the first stage T1, the second stage T2, the fourth stage T4 and the fifth stage T5, the driving principle and the driving process of the circuit diagram shown in FIG. 2 are the same as the driving principle and the driving process of the circuit diagram shown in FIG. 1, and only the driving process in the third stage T3 is specifically introduced and described hereinafter.

In the third stage (the data writing and compensation stage), for example the T3 stage shown in FIG. 4, the first emission control signal EM1 at low level is supplied to the first emission control signal line, the second emission control signal EM2 at low level is supplied to the second emission control signal line, the first scanning signal VG(n−4) at low level is supplied to the first scanning signal line, the second scanning signal VR at low level is supplied to the second scanning signal line, the third scanning signal VG(n) at high level is supplied to the third scanning signal line, and the fourth scanning signal VG(n+2) at low level is supplied to the fourth scanning signal line.

Figure 13:
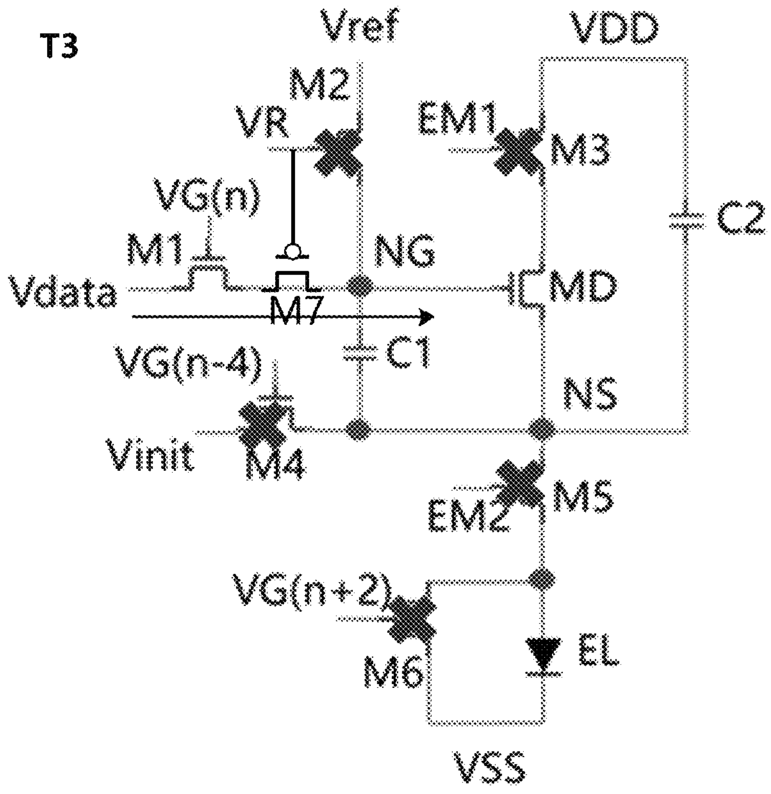
Figure 14:
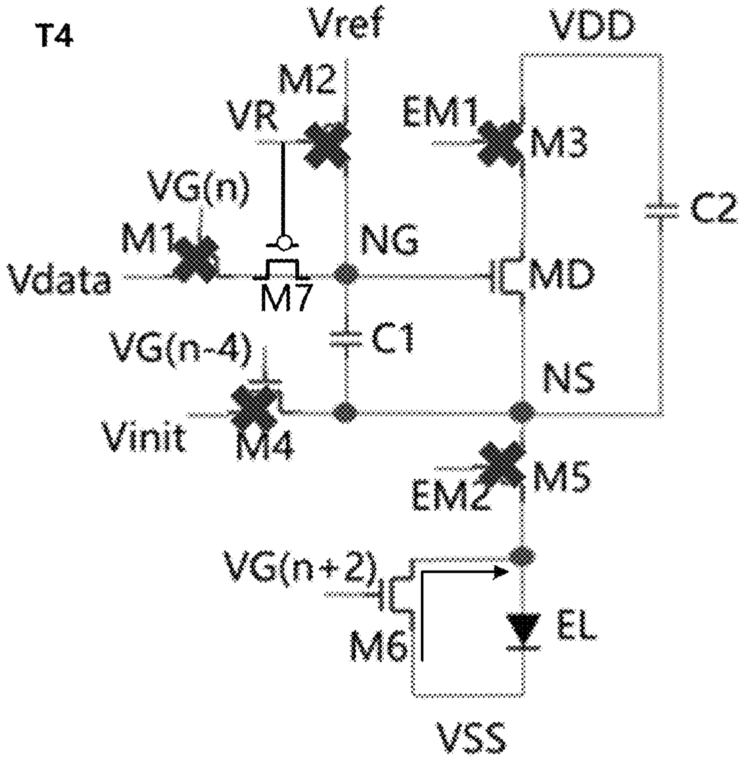
Figure 15:
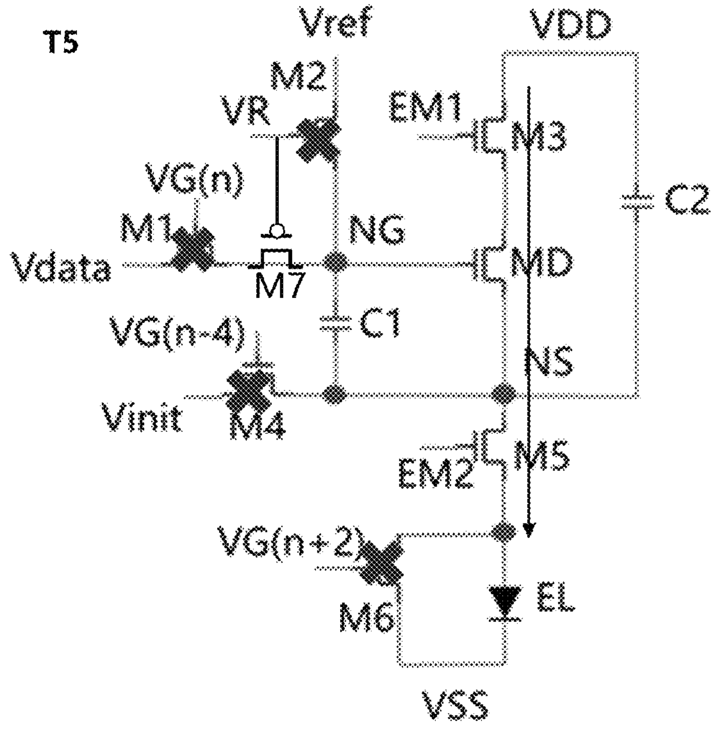

At this time, as shown in FIG. 4 and FIG. 13, the first transistor M1 and the seventh transistor are turned on at the same time, the potential of the second node NG is Vdata, and the driving transistor MD is turned on. Because the potential of the second node NG is changed from Vref in the previous stage into Vdata, the potential of the first node NS is changed as (Vdata−Vref)*C1/(C1+C2)+Vref−Vth due to a capacitive coupling effect, where C1 and C2 represent the capacitance values of the first capacitor and the second capacitor. In addition, because the fifth transistor M5 is turned off at this time, the potential of the first node NS will not be interfered by the potential of the anode of the light emitting device 8 and the IR Rise of the VSS in the second and third stages.

It should be noted that, because the third scanning signal VG(n) at high level is supplied to the third scanning signal line in advance before the third stage, for example the T3 stage shown in FIG. 4, and the first transistor M1 is turned on before the seventh transistor M7 is turned on, the data signal Vdata transmitted by the data line (Date line) is written into a place between the first transistor M1 and the seventh transistor M7 in advance. When the first transistor M1 and the seventh transistor M7 are turned on at the same time, the data signal Vdata can be quickly written into the gate of the driving transistor MD through the seventh transistor M7, thus shortening the transmission time of the data signal Vdata, increasing the refresh speed and the response speed of the pixel driving circuit, and improving the display effect of the display device.

The foregoing descriptions are merely detailed embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the scope of protection of the present disclosure should be subject to the appended claims.

The invention claimed is:

1. A pixel driving circuit, wherein the pixel driving circuit in an $n^{th}$ row comprises:

a reset sub-circuit electrically connected with a first reset signal line, a first scanning signal line, a first node, a second reset signal line, a second scanning signal line and a second node, wherein the reset sub-circuit is configured to reset a voltage of the first node under the control of a first scanning signal, and further configured to reset a voltage of the second node under the control of a second scanning signal;

a data writing sub-circuit electrically connected with a data line, a third scanning signal line and the second node, wherein the data writing sub-circuit is configured to write a data signal transmitted by the data line into the second node;

a driving transistor, wherein a gate of the driving transistor is electrically connected with the second node, a first electrode of the driving transistor is electrically connected with a third node, a second electrode of the driving transistor is electrically connected with the first node, and the driving transistor is configured to generate a driving current under the control of the voltage of the second node;

a first emission control sub-circuit electrically connected with a first emission control signal line, a first power supply line and the third node, wherein the first emission control sub-circuit is configured to transmit a first power supply signal to the driving transistor under the control of a first emission control signal;

a second emission control sub-circuit electrically connected with a second emission control signal line, the first node and an anode of a light emitting device respectively, wherein the second emission control sub-circuit is configured to transmit the driving current to the anode under the control of a second emission control signal;

a storage sub-circuit electrically connected with the first node, the second node and the first power supply line, wherein the storage sub-circuit is configured to store the voltage of the second node and adjust the voltage of the first node; and an anode reset sub-circuit electrically connected with the anode, a fourth scanning signal line and a second power supply line, wherein the anode reset sub-circuit is configured to reset the anode under the control of a fourth scanning signal;

wherein n is a positive integer, and the first scanning signal line, the third scanning signal line and the fourth scanning signal line are gate lines in different rows.

2. The pixel driving circuit according to claim 1, wherein pulse widths of scanning signals loaded on the first scanning signal, the third scanning signal and the fourth scanning signal are the same;

wherein the first scanning signal line is an $(n-4)^{th}$ gate line, the third scanning signal line is an $n^{th}$ gate line, and the fourth scanning signal line is an $(n+2)^{th}$ gate line;

wherein the $n^{th}$ gate line is electrically connected with the $n^{th}$ row of pixel driving circuits, an $n^{th}$ second scanning signal line is electrically connected with the $n^{th}$ row of pixel driving circuits, and n is greater than 4;

wherein an $m^{th}$ row of pixel driving circuits are dummy pixel driving circuits, m is a positive integer, and m is greater than or equal to 1 and less than or equal to 4, and is equal to n+1 or n+2;

wherein the $m^{th}$ row of pixel driving circuits are electrically connected with a shifting register in an $m^{th}$ row.

3. The pixel driving circuit according to claim 1, wherein the first reset signal line comprises a reference signal line, the second reset signal line comprises an initialization signal line, and an absolute value of a difference between a voltage of a reference signal transmitted by the reference signal line and a voltage of an initialization signal transmitted by the initialization signal line is greater than a threshold voltage of the driving transistor.

4. The pixel driving circuit according to claim 1, wherein the first reset signal line comprises the first power supply line, and the second reset signal line comprises the second power supply line.

5. The pixel driving circuit according to claim 1, wherein the data writing sub-circuit comprises a first transistor, a gate of the first transistor is electrically connected with the third scanning signal line, a first electrode of the first transistor is electrically connected with the data line, and a second electrode of the first transistor is electrically connected with the gate of the driving transistor through the second node, wherein a switching transistor is further arranged in series between the data line and the first transistor, and the switching transistor is configured to write the data signal into the data line before the first transistor is turned on; or the data writing sub-circuit comprises a first transistor and a seventh transistor, a gate of the first transistor is electrically connected with the third scanning signal line, a first electrode of the first transistor is electrically connected with the data line, and a second electrode of the first transistor is electrically connected with a first electrode of the seventh transistor; and a gate of the seventh transistor is electrically connected with the second scanning signal line, and a second electrode of the seventh transistor is electrically connected with the gate of the driving transistor through the second node.

6. The pixel driving circuit according to claim 5, wherein the reset sub-circuit comprises a second transistor and a fourth transistor; and a gate of the second transistor is electrically connected with the second scanning signal line, a first electrode of the second transistor is electrically connected with the first reset signal line, and a second electrode of the second transistor is electrically connected with the gate of the driving transistor through the second node; and a gate of the fourth transistor is electrically connected with the first scanning signal line, a first electrode of the fourth transistor is electrically connected with the second reset signal line, and a second electrode of the fourth transistor is electrically connected with the first node.

7. The pixel driving circuit according to claim 6, wherein the first emission control sub-circuit comprises a third transistor;

wherein a gate of the third transistor is electrically connected with the first emission control signal line, a first electrode of the third transistor is electrically connected with the first power supply line, and a second electrode of the third transistor is electrically connected with the third node.

8. The pixel driving circuit according to claim 7, wherein the second emission control sub-circuit comprises a fifth transistor;

wherein a gate of the fifth transistor is electrically connected with the second emission control signal line, a first electrode of the fifth transistor is electrically connected with the first node, and a second electrode of the fifth transistor is electrically connected with the anode.

9. The pixel driving circuit according to claim 8, wherein the storage sub- circuit comprises a first capacitor and a second capacitor;

wherein a first electrode of the first capacitor is electrically connected with the second node, and a second electrode of the first capacitor is electrically connected with the first node; and a first electrode of the second capacitor is electrically connected with the first power supply line, and a second electrode of the second capacitor is electrically connected with the second electrode of the first capacitor through the first node.

10. The pixel driving circuit according to claim 9, wherein the anode reset sub-circuit comprises a sixth transistor;

wherein a gate of the sixth transistor is electrically connected with the fourth scanning signal line, a first electrode of the sixth transistor is electrically connected with the anode, and a second electrode of the sixth transistor is electrically connected with the second power supply line and a cathode of the light emitting device respectively.

11. The pixel driving circuit according to claim 10, wherein, when the data writing sub-circuit comprises the first transistor, the first transistor, the second transistor, the third transistor, the fourth transistor, the fifth transistor, the sixth transistor and the driving transistor are all N-type transistors; and when the data writing sub-circuit comprises the first transistor and the seventh transistor, the first transistor, the second transistor, the third transistor, the fourth transistor, the fifth transistor, the sixth transistor and the driving transistor are all N-type transistors, and the seventh transistor is a P-type transistor.

12. The pixel driving circuit according to claim 3, wherein when the driving transistor is a N-type transistor, the voltage of the reference signal is greater than the voltage of the initialization signal, wherein the absolute value of the difference between the voltage of the reference signal and the voltage of the initialization signal ranges from 2 V to 4 V.

13. The pixel driving circuit according to claim 2, wherein a rising edge of a pulse signal transmitted by the second scanning signal coincides with a rising edge of a pulse signal transmitted by the first scanning signal, and a falling edge of the pulse signal transmitted by the second scanning signal coincides with a rising edge of a pulse signal transmitted by the third scanning signal, or the falling edge of the pulse signal transmitted by the second scanning signal is located behind the rising edge of the pulse signal transmitted by the third scanning signal.

14. The pixel driving circuit according to claim 13, wherein a scanning time of the third scanning signal is greater than a scanning time of the second scanning signal; or an overlapping time of the first emission control signal and the second scanning signal is greater than the overlapping time of the third scanning signal and the second scanning signal.

15. The pixel driving circuit according to claim 1, wherein the first emission control signal comprises a first pulse signal and a second pulse signal, the second emission control signal comprises a third pulse signal, and the second pulse signal coincides with the third pulse signal.

16. The pixel driving circuit according to claim 9, wherein a capacitance value of the second capacitor is less than a capacitance value of the first capacitor.

17. The pixel driving circuit according to claim 10, wherein the first transistor, the second transistor, the fourth transistor and the fifth transistor are all double-gate transistors; and two gates of the same transistor are electrically connected together; or the first transistor, the second transistor, the fourth transistor and the fifth transistor are all metal oxide transistors.

18. The pixel driving circuit according to claim 1, wherein the driving transistor is a double-gate transistor, one gate of the driving transistor is electrically connected with the second node, the other gate of the driving transistor is electrically connected with a signal input end with a constant voltage, and the constant voltage is less than a threshold voltage of the driving transistor.

19. A display device, comprising the pixel driving circuit according to claim 1.

20. A driving method, applied to the pixel driving circuit according to claim 1, wherein the method comprises:

in a first stage, inputting a first emission control signal at low level to the first emission control signal line, inputting a second emission control signal at low level to the second emission control signal line, inputting a first scanning signal at high level to the first scanning signal line, inputting a second scanning signal at high level to the second scanning signal line, inputting a third scanning signal at low level to the third scanning signal line, and inputting a fourth scanning signal at low level to the fourth scanning signal line;

in a second stage, inputting a first emission control signal at high level to the first emission control signal line, inputting the second emission control signal at low level to the second emission control signal line, inputting a first scanning signal at low level to the first scanning signal line, inputting the second scanning signal at high level to the second scanning signal line, inputting the third scanning signal at low level to the third scanning signal line, and inputting the fourth scanning signal at low level to the fourth scanning signal line;

in a third stage, inputting the first emission control signal at low level to the first emission control signal line, inputting the second emission control signal at low level to the second emission control signal line, inputting the first scanning signal at low level to the first scanning signal line, inputting a second scanning signal at low level to the second scanning signal line, inputting a third scanning signal at high level to the third scanning signal line, and inputting the fourth scanning signal at low level to the fourth scanning signal line;

in a fourth stage, inputting a first emission control signal at low level to the first emission control signal line, inputting the second emission control signal at low level to the second emission control signal line, inputting a first scanning signal at low level to the first scanning signal line, inputting a second scanning signal at low level to the second scanning signal line, inputting the third scanning signal at low level to the third scanning signal line, and inputting a fourth scanning signal at high level to the fourth scanning signal line; and in a fifth stage, inputting the first emission control signal at high level to the first emission control signal line, inputting a second emission control signal at high level to the second emission control signal line, inputting a first scanning signal at low level to the first scanning signal line, inputting the second scanning signal at low level to the second scanning signal line, inputting the third scanning signal at low level to the third scanning signal line, and inputting the fourth scanning signal at low level to the fourth scanning signal line.

* * * * *